US012387000B1

(12) United States Patent
McGuire et al.

(10) Patent No.: US 12,387,000 B1
(45) Date of Patent: Aug. 12, 2025

(54) PRIVACY-PRESERVING AVATAR VOICE TRANSMISSION

(71) Applicant: Roblox Corporation, San Mateo, CA (US)

(72) Inventors: Morgan Samuel McGuire, Waterloo (CA); Tom Sanocki, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 18/441,766

(22) Filed: Feb. 14, 2024

(51) Int. Cl.
| | |
|---|---|
| *G06F 21/62* | (2013.01) |
| *G06T 13/20* | (2011.01) |
| *G06T 13/40* | (2011.01) |
| *G10L 13/033* | (2013.01) |
| *G10L 13/10* | (2013.01) |
| *G10L 17/06* | (2013.01) |

(52) U.S. Cl.
CPC ........ *G06F 21/6245* (2013.01); *G06T 13/205* (2013.01); *G06T 13/40* (2013.01); *G10L 13/0335* (2013.01); *G10L 13/10* (2013.01); *G10L 17/06* (2013.01)

(58) Field of Classification Search
CPC ... G06F 21/6245; G06T 13/205; G06T 13/40; G10L 13/0335; G10L 13/10; G10L 17/06
See application file for complete search history.

(56) References Cited

U.S. PATENT DOCUMENTS

| | | | |
|---|---|---|---|
| 11,113,859 B1* | 9/2021 | Xiao | G06T 15/005 |
| 2004/0193421 A1* | 9/2004 | Blass | G06F 40/295 |
| | | | 704/258 |
| 2006/0098623 A1* | 5/2006 | Christian | H04K 1/02 |
| | | | 370/352 |
| 2018/0336880 A1* | 11/2018 | Arik | G10L 25/30 |

(Continued)

OTHER PUBLICATIONS

Shaohu Zhang, Shaohu Zhang, Anupam Das, "VoicePM: A Robust Privacy Measurement on Voice Anonymity", May 2023, WiSec '23: Proceedings of the 16th ACM Conference on Security and Privacy in Wireless and Mobile Networks (Year: 2023).*

(Continued)

*Primary Examiner* — Pierre Louis Desir
*Assistant Examiner* — Daniel W Chung
(74) *Attorney, Agent, or Firm* — IP Spring

(57) ABSTRACT

Some implementations relate to methods, systems, and computer-readable media to reproduce a voice stream with removed personally identifiable information (PII). An original voice stream is received from a user by a hardware processor. The original voice stream is converted into text using a machine learning (ML) voice transcription model. Then, the text is used for generating an anonymized voice stream corresponding to the text having similar auditory properties to the original voice stream other than PII using a machine learning (ML) voice synthesis model. The similar properties are determined using metadata corresponding to the original voice stream. The metadata may be obtained by analyzing acoustic characteristics of the original voice stream. The metadata may include volume changes and pitch (Continued)

frequency changes stored as metadata annotations associated with tokens in the text as key-value pairs. The generation may use the metadata annotations to determine the similar audio properties.

20 Claims, 17 Drawing Sheets

(56) References Cited

U.S. PATENT DOCUMENTS

| | | | | |
|---|---|---|---|---|
| 2019/0377901 | A1* | 12/2019 | Balzer | H04L 63/0421 |
| 2020/0051306 | A1* | 2/2020 | Park | G06T 7/73 |

OTHER PUBLICATIONS

Juan M. Perero-Codosero, Fernando M. Espinoza-Cuadros, Luis A. Hernández-Gómez, "X-vector anonymization using autoencoders and adversarial training for preserving speech privacy", Computer Speech & Language, vol. 74, 2022, 101351, ISSN 0885-2308, https://doi.org/10.1016/j.csl.2022.101351. (Year: 2022).*

Shaohu Zhang, Shaohu Zhang, Anupam Das, "VoicePM: A Robust Privacy Measurement on Voice Anonymity", May 2023, WiSec '23: Proceedings of the 16th ACM Conference on Security and Privacy in Wireless and Mobile Networks (Year: 2022).*

Sarina Meyer, Florian Lux, Pavel Denisov, Julia Koch, Pascal Tilli, Ngoc Thang Vu, "Speaker Anonymization with Phonetic Intermediate Representations", Jul. 11, 2022, arXiv:2207.04834v1, Institute for Natural Language Processing (IMS), University of Stuttgart, Germany (Year: 2022).*

Google Pixel Buds natural language translation, https://support.google.com/googlepixelbuds/answer/7573100?hl=en, 2017, 5 pages.

* cited by examiner

PRIVACY-PRESERVING AVATAR VOICE TRANSMISSION

TECHNICAL FIELD

Embodiments relate generally to computer-based gaming and virtual environments, and more particularly to methods, systems, and computer-readable media for providing voice transmission without personally identifiable information (PII), such as avatar voice transmission without PII.

BACKGROUND

A person's voice is distinctive and unique to that person. A person can be identified just by hearing that person's voice. Transmitting a person's voice over a computer network therefore includes transmitting personally identifiable information (PII) because it is possible for another person or an automated system to link the audio in the voice stream to a specific individual by recognition. Within the content of the voice stream there may also be spoken PII data such as phone numbers, names, addresses, and ages that link the stream to a specific individual.

Online platforms that include voice transmission functionality need to request and obtain user permission for transmission and storage of such data. Also, such permissions may be required to be obtained from a parent or a guardian, e.g., where applicable laws require such permission for certain users, e.g., users that are below an age threshold. Further, some users may benefit from being able to communicate via voice without identifying information being transmitted from the user device. Therefore, users that do not meet age thresholds or users that prefer to not have their voice transmitted may be unable to use features such as voice chat, voice commands, or other voice-based features offered by online platforms or services.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the prior disclosure.

SUMMARY

Implementations of this application relate to providing voice transmission that reduces or eliminates transmission of personally identifiable information (PII) and optionally with increased efficiency by transmitting the content stripped of the original audio signal. For example, the voice transmission may be avatar voice transmission in a virtual environment without PII.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

According to one aspect, a computer-implemented method to reproduce a voice stream with removed personally identifiable information (PII) comprises: receiving, by a hardware processor, an original voice stream from a user; converting the original voice stream to text using a machine learning (ML) voice transcription model; and generating an anonymized voice stream corresponding to the text having similar auditory properties to the original voice stream other than personally identifiable information (PII) using a machine learning (ML) voice synthesis model, wherein the similar auditory properties are determined using metadata corresponding to the original voice stream.

Various implementations of the computer-implemented method are described herein.

In some implementations, the metadata comprises metadata annotations to the text associating times with tokens and corresponding auditory properties and metadata annotations to the text associating times with intervals between tokens, and further comprising determining the similar auditory properties based on the metadata annotations.

In some implementations, the computer-implemented method further comprises providing the anonymized voice stream as a voice stream spoken by an avatar of the user in a virtual experience.

In some implementations, the metadata comprises volume changes, speed changes, and pitch frequency changes stored as metadata annotations that are associated with tokens in the text as key-value pairs and the generating comprises determining the similar auditory properties based on the metadata annotations.

In some implementations, the generating comprises filtering the anonymized voice stream to remove auditory properties of the original voice stream corresponding to personally identifiable information (PII), wherein the filtering is based at least in part on the metadata.

In some implementations, the computer-implemented method further comprises capturing a plurality of images of the user as the original voice stream is spoken by the user; associating a corresponding image of the user with one or more tokens from the original voice stream; analyzing each associated image to generate Facial Action Coding System (FACS) data; storing the FACS data as metadata annotations to the text; and generating an anonymized facial animation to accompany the anonymized voice stream based on the FACS data using a machine learning (ML) animation synthesis model.

In some implementations, the computer-implemented method further comprises generating facial expression data corresponding to the original voice stream; and generating an anonymized facial animation to accompany the anonymized voice stream from the facial expression data using a machine learning (ML) animation synthesis model.

In some implementations, the computer-implemented method further comprises analyzing acoustic characteristics of the original voice stream to obtain the metadata and wherein the metadata specifies the similar auditory properties.

In some implementations, the computer-implemented method further comprises, after the generating, further modifying the anonymized voice stream by performing at least one of noise addition, filtering, or smoothing on the anonymized voice stream.

In some implementations, the computer-implemented method further comprises, prior to the generating, editing the text to remove text comprising the personally identifiable information (PII).

In some implementations, the computer-implemented method further comprises filtering the anonymized voice stream using a filter provided by the user to match a particular vocal style.

In some implementations, the computer-implemented method further comprises sending an identity of the user to the ML voice synthesis model and determining the metadata by the ML voice synthesis model based on the text and the identity of the user, wherein the ML voice synthesis model is trained to output metadata from input text streams and user identities.

According to another aspect, a non-transitory computer-readable medium is provided. The non-transitory computer-readable medium has instructions stored thereon that, responsive to execution by a processing device, causes the processing device to perform operations comprising: receiving, by a hardware processor, an original voice stream from a user; converting the original voice stream to text using a machine learning (ML) voice transcription model; and generating an anonymized voice stream corresponding to the text having similar auditory properties to the original voice stream other than personally identifiable information (PII) using a machine learning (ML) voice synthesis model, wherein the similar auditory properties are determined using metadata corresponding to the original voice stream.

Various implementations of the non-transitory computer-readable medium are described herein.

In some implementations, the metadata comprises volume changes, speed changes, and pitch frequency changes stored as metadata annotations that are associated with tokens in the text as key-value pairs and the generating comprises determining the similar auditory properties based on the metadata annotations.

In some implementations, the operations further comprise analyzing acoustic characteristics of the original voice stream to obtain the metadata and wherein the metadata specifies the similar auditory properties.

In some implementations, the operations further comprise sending a specific voice for the user to the ML voice synthesis model and determining the metadata by the ML voice synthesis model based on the text and the specific voice for the user, wherein the ML voice synthesis model predicts metadata for a given user from a given text stream when provided with the specific voice for the user using a machine learning (ML) metadata prediction model.

According to another aspect, a system is disclosed, comprising: a memory with instructions stored thereon; and a processing device, coupled to the memory, the processing device configured to access the memory, wherein the instructions when executed by the processing device cause the processing device to perform operations including: receiving, by a hardware processor, an original voice stream from a user; converting the original voice stream to text using a machine learning (ML) voice transcription model; and generating an anonymized voice stream corresponding to the text having similar auditory properties to the original voice stream other than personally identifiable information (PII) using a machine learning (ML) voice synthesis model, wherein the similar auditory properties are determined using metadata corresponding to the original voice stream.

Various implementations of the system are described herein.

In some implementations, the metadata comprises volume changes and pitch frequency changes stored as metadata annotations that are associated with tokens in the text as key-value pairs and the generating comprises determining the similar auditory properties based on the metadata annotations.

In some implementations, the operations further comprise analyzing acoustic characteristics of the original voice stream to obtain the metadata and wherein the metadata specifies the similar auditory properties.

In some implementations, the operations further comprise sending an identity of the user to the ML voice synthesis model and determining the metadata by the ML voice synthesis model based on the text and the identity of the user, wherein the ML voice synthesis model predicts metadata for a given user from a given text stream when provided with the identity of the user using a machine learning (ML) metadata prediction model.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications, and all such modifications are within the scope of this disclosure.

DETAILED DESCRIPTION

Figure 1:
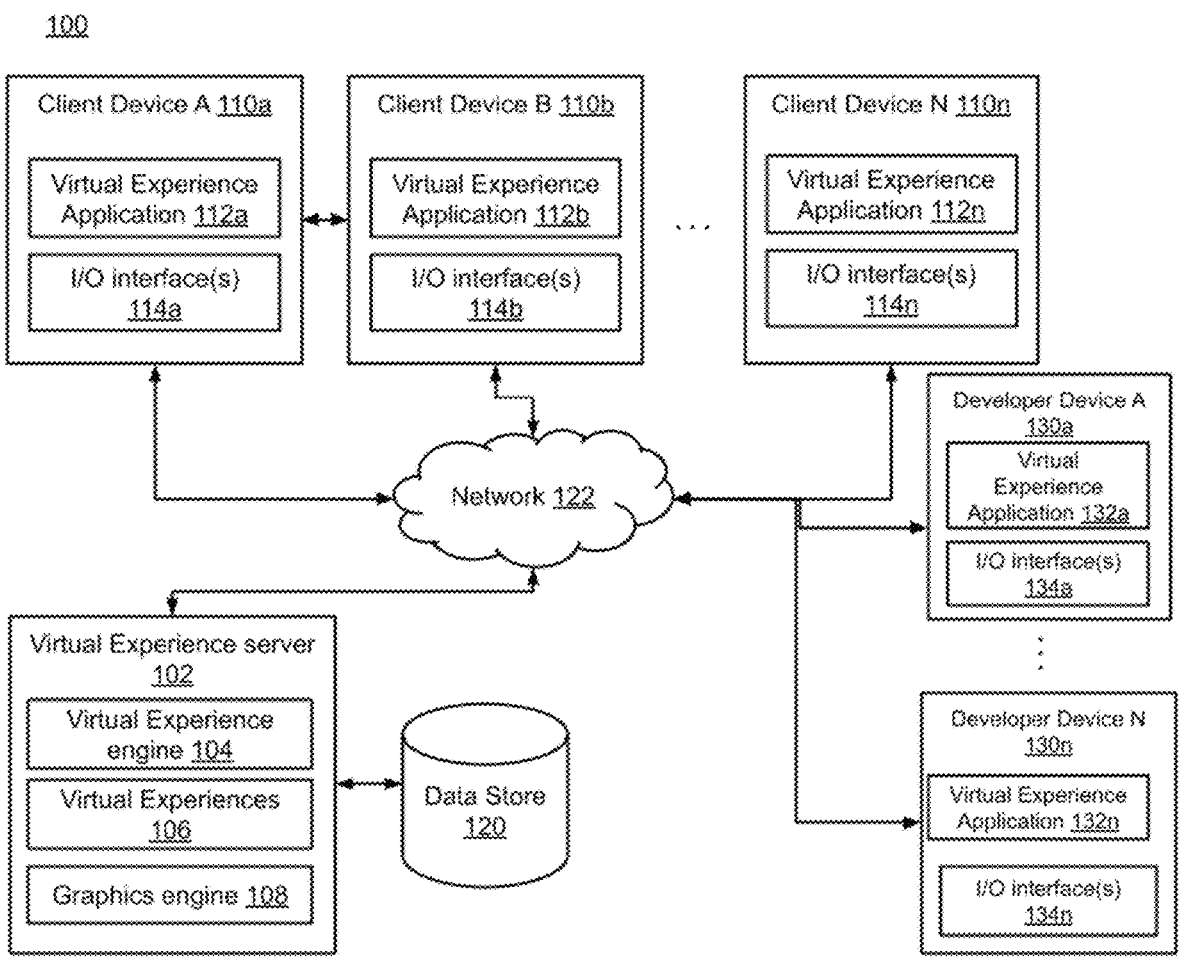
FIG. 1 is a diagram of an example system architecture for providing avatar voice transmission without personally identifiable information, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

One or more implementations described herein relate to voice transmission without personally identifiable information (PII). Such voice transmission may be associated with an online gaming platform, such as one that provides experiences in a virtual environment. In some implementations, features may include receiving an initial avatar voice stream and converting the voice stream to text, e.g., via machine learning (ML) speech transcription or any suitable automatic speech recognition (ASR) technique. The text may be associated with metadata on timing, emphasis, and volume. Then, the text is converted to a voice stream using machine learning (ML) voice synthesis, using the metadata and/or a filter provided by the user to match a desired vocal style.

In general, a virtual environment may refer to a platform that hosts many virtual experiences by managing access to virtual experiences. The virtual experiences correspond to individual users' interactions with a platform that provides interactive games that the users can play.

When playing these interactive games or participating in virtual experiences, users may wish to communicate with one another by speaking. However, when users speak, if their voices are unaltered, it may be possible to analyze users' speech patterns and identify the users. Identifying the user may be problematic if a user wishes to remain anonymous. Moreover, the content of speech may contain utterances that reveal the identity of the user. These utterances (such as phone numbers) are routinely removed from text communication on interactive platforms, however they are difficult to remove directly from voice. Furthermore, certain users (e.g., users that are below a certain age threshold) may have their identities protected by the virtual environment for their safety and privacy. Hence, it would be helpful to provide users who are to have such privacy with a way to communicate orally without sharing a voice stream that would disclose their identities.

Per some implementations described herein, PII is eliminated from a voice stream using a two-stage process. First, convert the voice stream to text via ML voice transcription, accompanied with metadata on time and auditory properties such as pitch and volume. Second, convert the text back to a voice stream using ML voice synthesis, using a filter provided by the user to match a particular vocal style. This approach retains the original content (spoken words/singing/other audio input) spoken by the user and non-identifiable attributes from the original content, but removes PII (e.g., a voice characteristic, a style of speaking, etc.) by removing the aspects of the voice stream that could link the spoken content to a particular user.

For example, there may be several aspects of the conversion of the voice stream to text via machine learning (ML) voice transcription, with metadata on pitch and volume (and/or additional attributes of the voice stream). Initially, a microphone or similar sound receipt device may capture the voice stream. The microphone transforms the voice stream into an electrical signal. From the electrical signal corresponding to the voice stream, it may be possible to capture volume changes, pitch frequency changes, timing (e.g., speed changes), and other attributes of the voice stream. These attributes of the voice stream may be stored as metadata annotations to the text transcription to capture how words and syllables (or phrases) in the words were spoken. The words and syllables (or phrases) may also be referred to as tokens that comprise the voice stream. In implementations, a token corresponds to a subunit of the voice stream to be processed. Thus, a token may refer to one or more syllables, a word, or a phrase depending on an implementation.

While volume and pitch are provided as examples of attributes of the voice stream, other aspects of the voice stream may be recorded and may be relevant. For example, the voice stream may be associated with various prosodic attributes. Prosody includes elements of speech that are not individual phonemes (vowels and consonants), but which instead characterize syllables and larger units of speech. Prosody may include intonation, stress, and rhythm.

Prosody may characterize aspects of the speaker or the utterance, such as an emotional state, a type of utterance (statement, question, or imperative), the presence of irony or sarcasm, emphasis, contrast, and focus. Hence, prosody may communicate aspects of what is said that goes beyond the actual words, or even the grammar or punctuation. Capturing prosody may be important because if a statement is reconstructed, it may help capture aspects of the statement that would otherwise disappear after reconstruction.

Prosody may be considered based on auditory factors, which are subjective impressions produced in the mind of a listener, and objective measures, which are physical properties of a sound wave and physiological characteristics of producing the sound that may be measured objectively. It may be complicated to relate auditory factors with objective measures. One way to relate auditory factors with objective measures is to process acoustic features of the sound and infer corresponding auditory factors.

For example, one auditory variable may be the pitch of the voice in the voice stream (varying between low and high). Pitch may correspond to a fundamental frequency (measured in hertz, or cycles per second). Another auditory variable may be length of sounds (varying between short and long). Length of sounds may correspond to a duration of the sounds (measured in time units such as milliseconds or seconds).

Yet another auditory variable may be loudness (varying between soft and loud). Loudness may correspond to intensity or sound pressure (measured in decibels). Also, timbre or phonatory quality may be an auditory variable. Timbre may correspond to spectral characteristics, which may be featured as the distribution of energy at different parts of the audible frequency range. Because such spectral characteristics may be used as part of identifying a user, it may be necessary to remove spectral characteristics of an initial speaker from a voice stream.

These auditory variables can influence intonation, stress, rhythm, tempo, voice quality, pausing, and signaling of emotion and attitudes. Hence, a task performed in some implementations as part of analyzing a voice stream may include capturing prosodic attributes of the voice stream. By doing so, some implementations provide a way to capture what is communicated by the prosody while obscuring aspects of the prosody that may reveal the user's identity and privacy.

Thus, from the voice stream, some implementations may capture metadata about the words and syllables in the voice stream. For example, the capturing may capture volume changes, pitch frequency changes, and timing, which may be stored as metadata annotations to the text transcription. Such annotations capture how words and syllables in the word were spoken. From the voice stream, the processing may capture timing using metadata annotations to the text to make it possible to capture time between words and syllables and the time spent saying a word/syllable.

In addition to using a microphone to capture a voice stream, some implementations may use a camera to capture a plurality of images of a user as they provide the voice stream, e.g., frames of a video of a video stream of the user (e.g., 25 frames per second, 30 fps, 60 fps, etc.), or a series of still images (e.g., one image per second, two images per second, etc.). The video or images may be captured at the same time the voice stream is captured by a microphone. The video or image may be analyzed to capture face shapes (lips, eyebrows, nose, eyelids, eye direction, etc.).

These captured shapes may be converted to floating point values following the Facial Action Coding System (FACS) animation standard. The FACS values may be stored as metadata annotations to the text transcription to capture how the face looked when the syllable/word was formed. However, the camera data may be optional. In some implementations, it may be possible to perform analysis of the voice stream to infer facial expressions. Whether FACS data for a camera image and/or voice analysis is used to generate the face, the generated face is rendered such that it helps indicate what the user's face looked like without providing an actual representation of a user that may impact the privacy of that user.

In some implementations, metadata annotations are stored as key-value pairs. The values may be stored as curves that track the changes in values over time. For example, the "volume" metadata key may be associated with values that indicate volume levels in the voice stream, e.g., that can be utilized to determine changes in the volume over time. The text stream records time value so that there is a direct correspondence between each token (e.g., word, syllable, or chunk of syllables) and the metadata for that token.

In some implementations, the metadata is created from the camera and microphone of the user. If available, camera video is processed on-device and converted to FACS animation data. Additional metadata may be created by processing the voice stream (e.g., measure volume in decibels). However, another approach is to use a machine learning (ML) model that generates metadata based on the transcribed text and the identity of the user.

Once the text and metadata are ready, the text is converted to a voice stream using machine learning (ML) voice synthesis (or other suitable text-to-speech techniques). The conversion may use a filter provided by the user to match vocal style. For example, the user may be provided with a plurality of options of available filters, and may select a particular filter (or a combination of filters). For example, the metadata may be part of the filter. The filter may help reproduce aspects of the original voice stream, such as pitch, volume, and other prosodic attributes.

If available, the FACS animation data may be used to recreate the facial expression of the user when the user was saying the original voice stream. If FACS animation data is not available (e.g., there was no camera to produce pictures/video or one or more images are missing), it may be possible to synthesize lip shapes and other aspects of facial expressions by processing the audio. The remaining metadata (volume, timing, etc.) may be used to reconstruct the intonation and "feel" of the original voice. In some implementations, it may be possible to introduce noise or additional filters/smoothing on the data to further obfuscate a user's identity.

Once a voice stream has been converted to text, it may also be helpful to apply current best practices to remove specific PII categories from the content of the text. For example, such information may include names, ID numbers, other types of personal identifiers, gender information, birthdates, phone numbers, addresses or location information, online accounts/handles, or other types of personal information. Removing PII may include replacing the text with a pause, a tone, a placeholder word, and so on.

Once the voice stream has been converted to text, that conversion eliminates the primary source of inadvertent disclosure of PII. That source is the user's distinctive voice qualities. Such vocal qualities may otherwise be traced back to an individual human speaker. In some implementations, the final result is intended to sound like a human voice, but the voice stream cannot be traced back to a specific individual.

In some implementations, as a bandwidth optimization technique, there may be a training data set that includes metadata and text from a representative sample of a particular user to train a per-user ML model to predict metadata from a given text stream that corresponds to a recognized voice stream. Once the training is complete, it is possible to perform voice stream transformation without access to metadata for the voice stream. In some implementations, ML inference on the per-user model may be used to generate metadata from the text input. This can enable generation of a transformed voice stream that retains non-PII characteristics of the user's voice while only transmitting the transcribed text.

In some implementations, as a bandwidth optimization technique, the text and metadata may be transmitted to the receiver for generation on the local machine that is playing the audio and has the speakers. This requires both ends of the connection to be aware of the PII protecting protocol. In other implementations, the generation operation may be performed on the local machine that is recording the audio and has the microphone. This ensures that PII does not leave the protected user's machine and allows interoperation with a generic audio receiving device, such as a third party voice chat service, audio conferencing software, or a telephone.

Thus, the approaches discussed herein may be of value in any use case where use of voice features is required without divulging user identifiable features. Such use cases may include voice/video chat, gaming, collaboration applications, etc.

FIG. 1—System Architecture

FIG. 1 is a diagram of an example system architecture for providing avatar voice transmission without personally identifiable information, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online virtual experience server 102, data store 120, client devices 110a, 110b, and 110n (generally referred to as "client device(s) 110" herein), and developer devices 130a and 130n (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowcharts shown in FIGS. 4, 9, and 12. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participants(s); accessories utilized by participants; etc.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual experience environment, accessories utilized by virtual experience participants, etc. In some implementations, the chat transcripts may include multilingual content, and messages in different languages from different sessions of a virtual experience may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be a virtual gaming server. For example, the gaming server may provide single-player or multiplayer games to a community of users that may access as "system" herein) includes online gaming server 102, data store 120, client or interact with virtual experiences using client devices 110 via network 122. In some implementations, virtual experiences (including virtual realms or worlds, virtual games, other computer-simulated environments) may be two-dimensional (2D) virtual experiences, three-dimensional (3D) virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments" or "virtual environments" herein) where multiple environments may be linked. An example of an environment may be a three-dimensional (3D) environment. The one or more environments of a virtual experience 106 may be collectively referred to as a "world" or "virtual experience world" or "gaming world" or "virtual world" or "universe" herein. An example of a world may be a 3D world of a virtual experience 106. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 exceeds a threshold number, the online virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For instance, the online virtual experience server 102 may perform one or more logical operations (e.g., using virtual experience engine 104) on the control instructions to generate experience instruction(s) for the client devices 110. In other instances, online virtual experience server 102 may pass one or more or the control instructions from one client device 110 to other client devices (e.g., from client device 110a to client device 110b) participating in the virtual experience 106. The client devices 110 may use the experience instructions and render the virtual experience for presentation on the displays of client devices 110.

In some implementations, the control instructions may refer to instructions that are indicative of actions of a user's character within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110b to client device 110n), where the other client device generates experience instructions using the local virtual experience engine 104. The control instructions may include instructions to play a voice communication message or other sounds from another user on an audio device (e.g., speakers, headphones, etc.), for example voice communications or other sounds generated using the techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g. shirts, pants, etc. the online virtual experience platform may provide users access to simplified 3D virtual object models that are represented by a mesh of a low polygon count, e.g. between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character virtual experience object (e.g., body parts, etc.) but the user may control the character (without the character virtual experience object) to facilitate the user's interaction with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 110 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application may be an online virtual experience server application for users to build, create, edit, upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to developer device 130 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or engage in virtual experiences 106 hosted by online virtual experience server 102). As such, the virtual experience application may be provided to the client device(s) 130 by the online virtual experience server 102. In another example, the virtual experience application 132 may be an application that is downloaded from a server. Game application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience developer may obtain access to virtual experience virtual objects, such as in-platform currency (e.g., virtual currency), avatars, special powers, accessories, that are owned by or associated with other users.

In general, functions described in one implementation as being performed by the online virtual experience server 102 can also be performed by the client device(s) 110, or a server, in other implementations if appropriate. In addition, the functionality attributed to a particular component can be performed by different or multiple components operating together. The online virtual experience server 102 can also be accessed as a service provided to other systems or devices through suitable application programming interfaces (APIs), and thus is not limited to use in websites.

Figure 2:
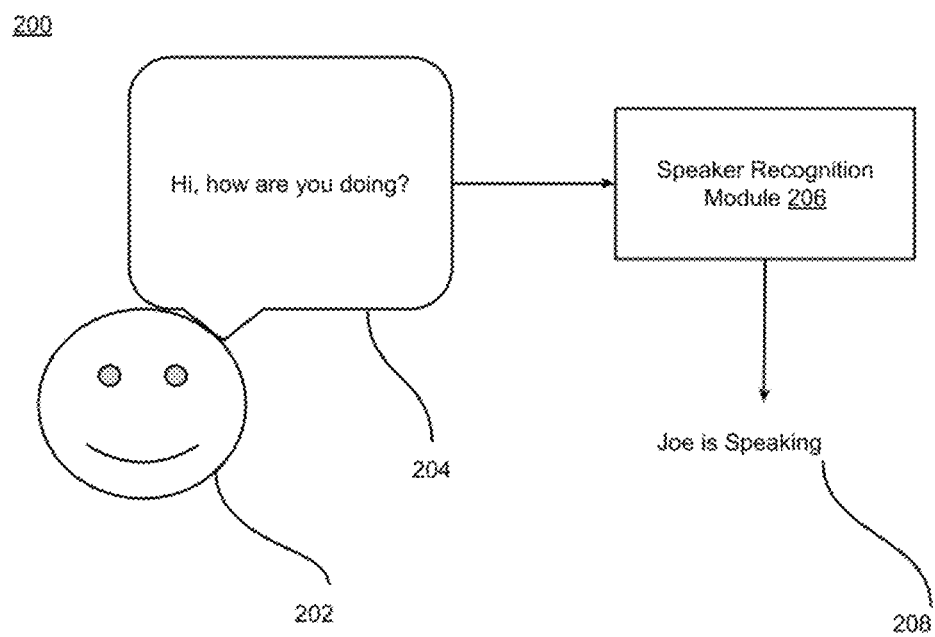
FIG. 2 is a diagram that illustrates aspects of how an ordinary voice stream may be recognized, in accordance with some implementations.

FIG. 2—Ordinary Voice Stream

FIG. 2 is a diagram 200 that illustrates aspects of how an ordinary voice stream may be recognized, in accordance with some implementations. Here, an ordinary voice stream refers to a voice stream that is reproduced and/or transmitted as uttered. Such a voice stream, when played back at a recipient end, sounds the same as when the voice stream is uttered by its speaker. For example, FIG. 2 shows a user 202 who makes a statement 204, "Hi, how are you doing?" The statement 204 may have various characteristics that allow identification of user 202, such as a speech pattern corresponding to user 202. Hence, in the example of FIG. 2, it is possible to perform speaker recognition based on the voice stream.

Speaker recognition is a pattern recognition problem. In some examples, speaker recognition may include processing and recognizing voice prints using technologies such as frequency estimation, hidden Markov models, Gaussian mixture models, pattern matching algorithms, neural networks, matrix representations, vector quantization, and decision trees. Another technique to compare a spoken utterance to a known voice print may be cosine similarity. Other techniques may include cohort models and world models.

A voice print is typically represented by spectral characteristics. Such spectral characteristics may play a role in the approach known as Linear Predictive Coding (LPC). These techniques take speech and identify a sample as being uttered by a speaker, based on matching to a voice print. Such matching is reliable, though it may be necessary to manage noise.

Thus, statement 204 may be provided as input into a speaker recognition module 206. Speaker recognition module 206 can take a voice stream and associate the voice stream with the identity of the speaker. For example, speaker recognition module 206 may use techniques such as the previously listed techniques and find an identity of the speaker. For example, speaker recognition module 206 could find a voice print of the user and match it to a stored voice print, establishing the user's identity.

Hence, because statement 204 is provided directly to speaker recognition module 206 without modification, speaker recognition module 206 may make the determination 208 that "Joe is Speaking" because statement 204 has the characteristics of Joe's voice (that is, a voice print of Joe's voice that may be recognized using various techniques and pre-stored information about the way Joe speaks). Speaker recognition module 206 is able to recognize this and violate Joe's privacy.

Accordingly, in scenarios as shown in FIG. 2, unaltered voice streams are provided by speakers. These unaltered voice streams may be transmitted to a receiving speaker recognition module 206, and the identities of the speakers may then be determined from information about vocal characteristics of the users. The scenario presented in FIG. 2 illustrates that, without alteration, a user's voice allows for identification of that user.

While this identification may cause privacy issues for any user, this issue can prevent users that do not want to reveal their identity from using voice chat or other voice-based features. Also, certain users, e.g., users below an age threshold, may also be restricted from voice chat or other voice features due to safety concerns and or regulatory requirements. In order for a virtual environment to be considered safe and secure for all users to use, it is imperative that the identities of the users be safeguarded. Nonetheless, users may wish to communicate with other participants in the virtual environment by voice communication. Hence, the implementations may provide a way to address this issue by preserving the content and manner of speech of a user while preventing the identification that could otherwise occur as shown in FIG. 2.

Figure 3:
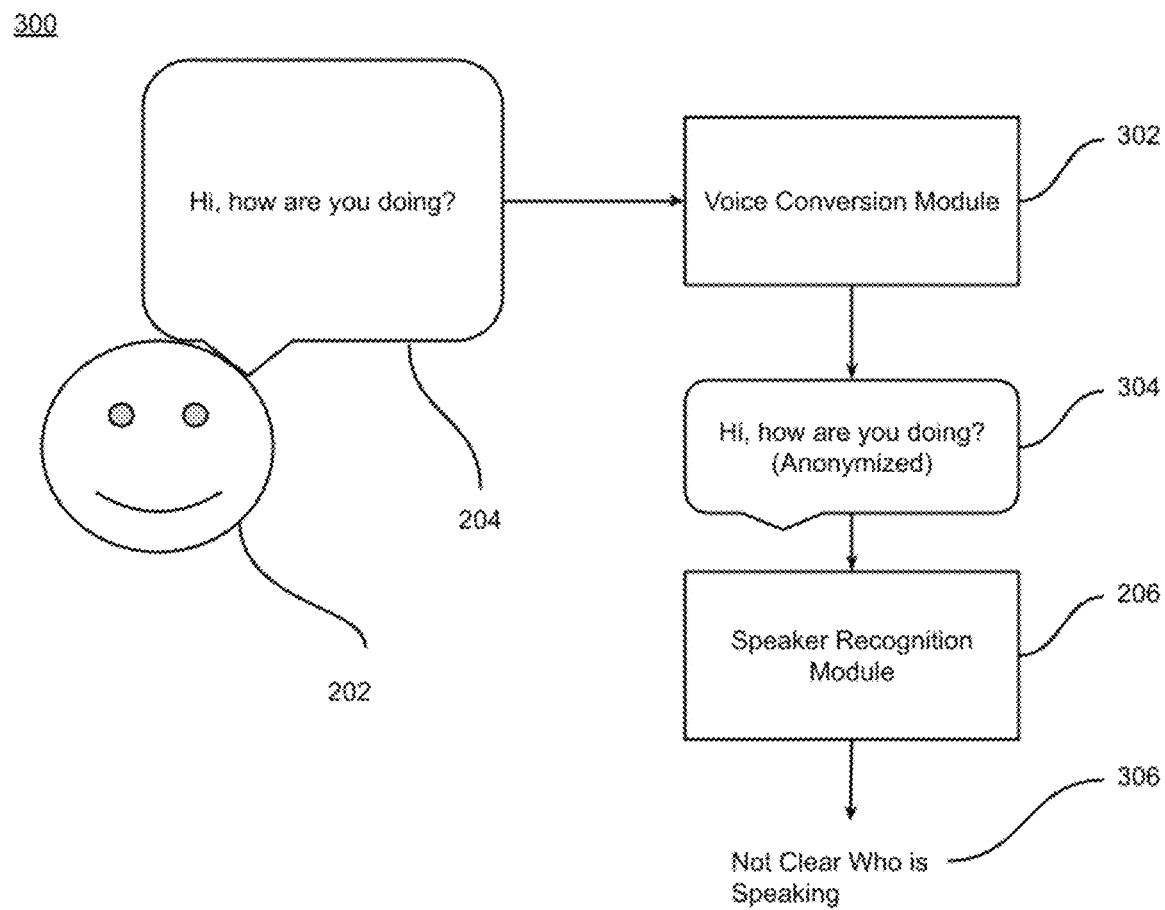
FIG. 3 is a diagram that illustrates aspects of how a processed voice stream with voice characteristics modified can protect user privacy, in accordance with some implementations.

FIG. 3—Processed Voice Stream

FIG. 3 is a diagram 300 that illustrates aspects of how a processed voice stream with voice characteristics modified can protect user privacy, in accordance with some implementations. For example, in the same manner as shown in FIG. 2, user 202 makes a statement 204, "Hi, how are you doing?" However, the statement 204 is input into voice conversion module 302 before the statement 204 (voice stream that includes the statement) is shared with any other user.

Voice conversion module 302 performs the operations discussed in greater detail herein that take a voice stream, transform the voice stream into text, and resynthesize the voice stream based on the text and associated metadata. The associated metadata may be obtained in a variety of ways. As shown in FIG. 3, voice conversion module 302 receives statement 204. Voice conversion module 302 then outputs an anonymized statement 304 "Hi, how are you doing." rendered in a voice that protects user privacy, such that voice print for the user cannot be determined from the output.

In FIG. 3, statement 304 includes the same textual content as statement 204. Moreover, the voice conversion module 302 obtains metadata associated with statement 204, such as volume and pitch. In some implementations, the metadata is obtained by analyzing acoustic properties of the statement 204. In other implementations, a machine learning (ML) voice synthesis model is trained based on user speech to generate metadata for regenerating the voice stream based on the text and metadata associated with the user, such as by using a machine learning (ML) metadata prediction module.

By tracking this metadata, when outputting anonymized statement 304, statement 304 sounds like it comes from a human speaker with speech qualities similar to that of the original speaker, but transformed sufficiently that a receiver cannot establish the identity of the original speaker. Hence, the anonymized statement 304, generated as discussed above, may be provided as input into speaker recognition module 206. The content of the speech is still intelligible in anonymized statement 304.

However, the output of the speaker recognition module 206 in the scenario illustrated in FIG. 3 has been filtered in a way such that it is not clear who is speaking 306. Accordingly, FIG. 3 shows the beneficial effects of some of the approaches discussed herein. In some implementations, it is possible to modify a voice stream before sharing it with others, such as other users of a virtual environment. The modifications defined in implementations provide for a way to retain the content and the attributes of speech while keeping a speaker's identity secure.

Figure 4:
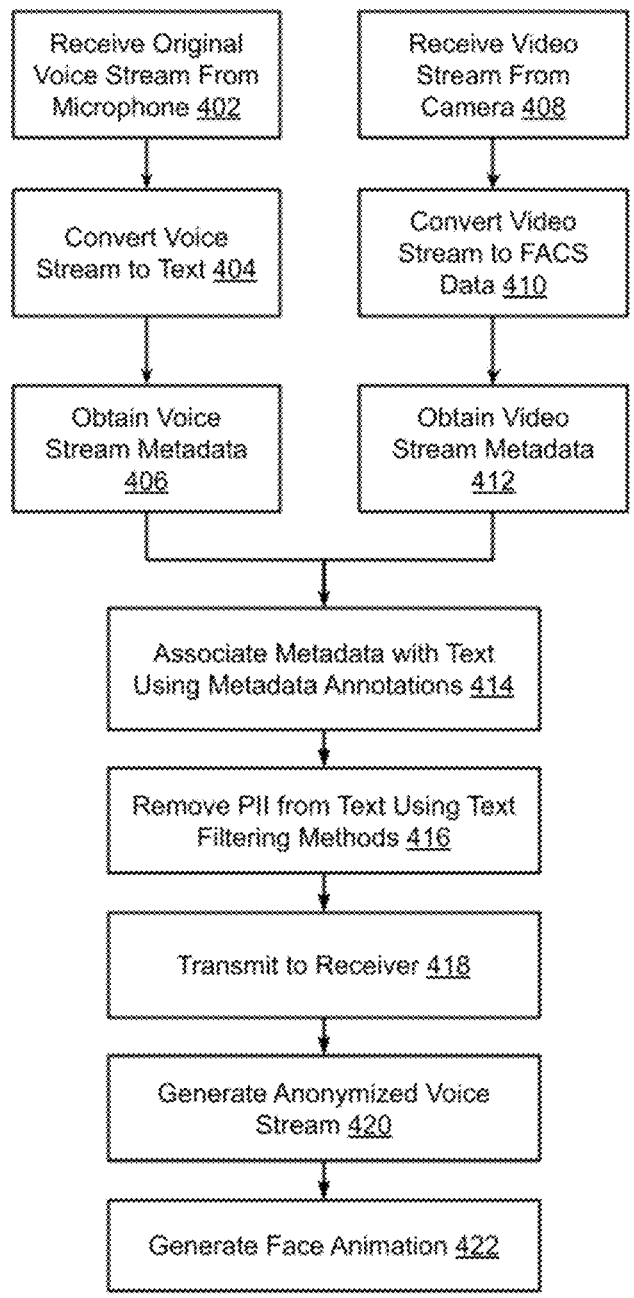
FIG. 4 is a flowchart of an example method to provide avatar voice transmission without personally identifiable information, in accordance with some implementations.

FIG. 4—Method of Avatar Voice Transmission without PII

FIG. 4 is a flowchart of an example method 400 to provide avatar voice transmission without personally identifiable information, in accordance with some implementations.

In block 402, a voice stream is received from a microphone. The microphone receives an audio signal as the user utters the voice stream. In some implementations, the microphone may be integrated into a device used to interact with a virtual environment. In other implementations, the microphone may be an external microphone that is connected to a device used to interact with the virtual environment.

The microphone may be a transducer that transforms sound into an electrical signal. Sound consists of air pressure variations. For example, the microphone may be a dynamic microphone, a condenser microphone, or a contact microphone. The electrical signal may be amplified, if necessary. Block 402 may be followed by block 404.

In block 404, the voice stream is converted to text. The voice stream received from the microphone may be an electrical signal. For example, the electrical signal may be a digital representation of the analog waveform of the sound. Once digitized, pattern recognition allows identification of text associated with the voice stream.

For example, two example techniques for identifying such text include hidden Markov models and neural networks. For example, hidden Markov models break down spoken words into phonemes. Neural networks perform pattern recognition to identify components of speech. For example, recurrent neural networks use outputs from previous steps as well as the current step as inputs to a current step. Any automatic speech recognition (ASR) technique can be used. Block 404 may be followed by block 406.

In block 406, voice stream metadata is obtained. Several types of voice stream metadata may be obtained. Such metadata may be stored in association with the text, as metadata annotations. For example, the voice stream metadata may include timing annotations that define when tokens such as words or syllables are being spoken.

The voice stream metadata may also include timing annotations that define times between words and syllables. The voice stream metadata may also include auditory property annotations that specify values of auditory properties of the voice stream. The auditory property annotations may be associated with certain tokens such as words or syllables as key-value pairs that define a curve that tracks the change in the value over time.

For example, the auditory properties may include volume changes and pitch frequency changes. Auditory property changes could associate each word or syllable with associated volume changes and pitch frequency changes. Such metadata can be used to incorporate volume and pitch frequency changes later, when generating the anonymized voice stream.

The metadata may be obtained in at least two ways. One way is to analyze acoustic properties of the original voice stream. For example, measuring a loudness in decibels (dB) may measure volume changes and measuring frequency changes in hertz (Hz) may measure pitch changes. Another way to obtain the metadata is based on user identity. For example, it may be possible to train a machine learning (ML) metadata precision model associated with a ML voice synthesis model to automatically derive metadata that specifies auditory properties for the anonymized voice stream based on the user's identity and the text, without a need to specifically measure properties of the original voice stream. Block 406 may be followed by block 414.

Thus, implementations may provide a way to gather audio information used to anonymize an original voice stream. Such an anonymized voice stream replicates the words originally spoken along with properties of the original voice stream. However, in some implementations, there may be provided a feature to accompany the anonymized voice stream with a generated animation based on the user's facial expressions when uttering the original voice stream. Accordingly, some implementations can additionally capture video or a plurality of successive still images and use this information to obtain video stream metadata.

Block 404 produces text corresponding to the original voice stream. However, implementations may wish to have access to metadata that defines additional auditory characteristics of the original voice stream. With such metadata, it is possible to use the text to reconstruct the content and attributes of the original voice stream, rather than just the text content.

In some implementations, block 408, block 410, and block 412 may occur. In block 408, a video stream is received from a camera. In some implementations, the video stream is received after receiving user permission to capture the images. Block 408 may occur as block 402 occurs. For example, as block 402 occurs, a user is uttering the original voice stream. In addition to preserving the auditory aspects of the original video stream, some implementations may be designed to reproduce facial expressions of the user.

However, providing an actual photograph of the user can divulge the user's identity. Hence, in some implementations, various approaches may be used to generate a facial animation that reproduces the actual user's facial expressions. For example, the facial expressions may be analyzed to cause the user's avatar to mimic the facial expressions as the user's avatar appears to say the audio content. Block 408 may be followed by block 410.

In block 410, the video stream is converted to Facial Action Coding Stream (FACS) data. The FACS is a system to taxonomize human facial movements by their appearance on the face. The information may include codes for action units (AUs), action descriptors (ADs), and intensity scoring. Hence, with access to this information, the FACS data may represent the user's facial expressions in a compact, easily shareable form. Moreover, the FACS data may be derived such that at each token (e.g., word or syllable) spoken by the user, the video stream yields a representative image. The representative image can then produce the appropriate FACS information. Block 410 may be followed by block 412.

In block 412, video stream metadata is obtained. If there are images, the images corresponding to the spoken words and syllables have been processed to yield FACS data. However, the camera is optional, and there may not be FACS data. Alternatively, there may be insufficient FACS data to fully reconstruct the facial expressions. It may also be desirable to confirm the information captured in the FACS data.

Hence, in addition to receiving FACS data as the video stream metadata, the text may be analyzed to produce suitable lip shapes and other facial expressions that would be likely to occur if a user's avatar uttered the text. Accordingly, the generated facial animation corresponds well to what is being said as an accompaniment to an animation, such as by an avatar. Block 412 may be followed by block 414.

In block 414, the metadata may be associated with the text using metadata annotations. For example, the metadata may include timing metadata and auditory property metadata associated with the vocal aspects of the text and timing metadata and facial animation property metadata associated with the corresponding facial expressions. Block 414 may be followed by block 416.

In block 416, PII is removed from the text using text filtering methods. For example, the text may be processed to remove phone numbers, addresses, ages, names, and so on, as non-limiting examples. In one approach, the text may be processed to check known information corresponding to a given user (such as the user's name) and confirm that the information is not present in the text. Alternatively, the text may be processed to identify information corresponding to a format that is likely to be PII. For example, a series of ten digits may potentially correspond to a telephone number. These are example approaches and other implementations may use other ways to remove PII. Block 416 may be followed by block 418.

In block 418, information generated previously is transmitted to a receiver. This transmitted information may include the text and its accompanying metadata. The transmitted information may also include video stream data, such as FACS data or other metadata associated with the video stream. By transmitting this information to the receiver, the receiver may have access to sufficient information to reconstruct anonymized audio streams and video streams. Block 418 may be followed by block 420.

In block 420, an anonymized voice stream is generated. For example, at block 420, the generation of the anonymized voice stream may have access to text that corresponds to the original voice stream. Such text may include tokens (e.g., words and syllables). The tokens may have been associated with metadata in block 414. The metadata allows for additional processing of a text-to-speech process that regenerates the literal content of the original voice stream.

For example, the metadata for the anonymized voice stream may be derived by analyzing the acoustic properties of the original voice stream. Alternatively, the metadata for the anonymized voice stream may be generated by considering the content of the text in light of typical auditory properties associated with a given user. Block 420 may optionally be followed by block 422.

In block 422, optionally, facial animation is generated. The facial animation may be generated using Facial Action Coding System (FACS) data, if the FACS data is available. For example, the FACS data may indicate what the characteristics of the face look like at particular points in time. The facial animation may be generated so as to smoothly transition from defined face to defined face, as the words and syllables are presented in the anonymized voice stream.

In some implementations, block 422 may be performed based purely on text and audio (blocks 402, 404, 406) (e.g., creating facial expressions based on text and voice metadata only). This approach has the advantage of providing facial animations without any video input (i.e., there is no camera, the camera is turned off, etc.). In some implementations, block 422 may be performed based on this information as well as FACS data (blocks 408, 410, 412), when available. This approach has the advantage of being based on the user's actual expressions, while still preserving privacy.

Additionally, the original voice stream may include clues about how to produce the facial animation. For example, the words in the text and the corresponding audio in the original voice stream may correspond to lip motions or other changes of facial appearance. Hence, by using FACS data and/or speech data, block 422 may perform operations that generate a facial animation. Block 422 may follow block 420.

Once block 420 (and optionally, 422) are complete, the generated anonymized voice stream may be provided to a receiving user. Further, the anonymized voice stream may be accompanied by an optional generated facial animation. Accordingly, the anonymized voice stream reproduces the content of the original speech, the overall intonation and "feel" of the original speech. The optional animation may be a facial animation (e.g., for the avatar) that resembles the actual facial expressions of the user as they produced the speech. However, the anonymized voice stream and facial animation include transformations that protect the user privacy and identity of the speaking user.

FIG. 4 provides for an order of operations in which the data transmission (including text and corresponding metadata, as well as optional metadata corresponding to the video stream) precedes the generation aspects. This approach is extremely efficient, in that text and metadata requires minimal bandwidth to transmit and can then be used after transmission to generate the anonymized streams. However, if the generation is performed before transmission (for example, if the operations included in block 420 and optionally block 422 occur first, and anonymized streams are transmitted in block 418) this would allow the used of an unmodified receiver that expects streams. Such an alternative receiver would not have to be modified for PII preservation.

Figure 5:
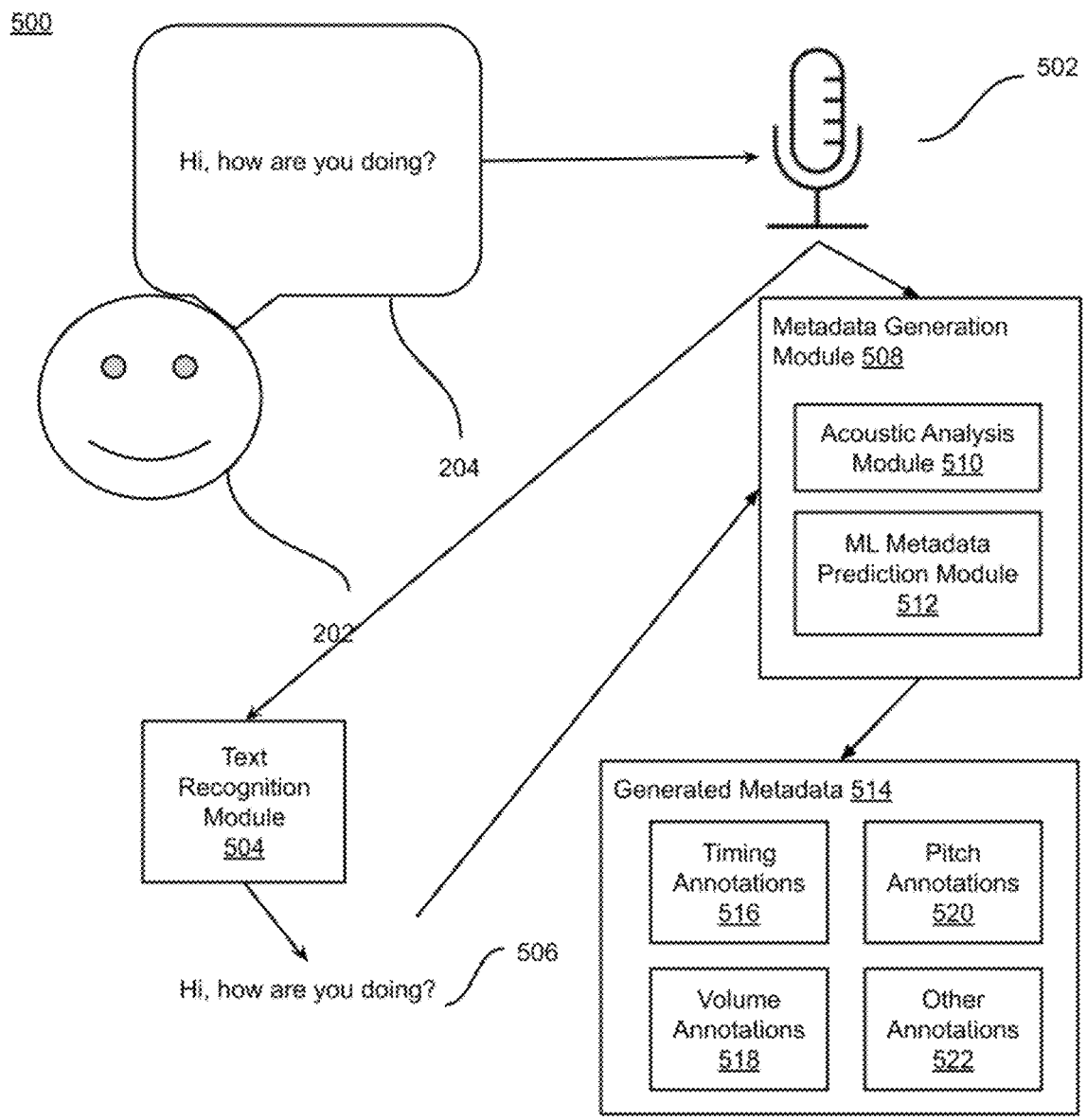
FIG. 5 is a diagram of receiving and transcribing a voice stream, in accordance with some implementations.

FIG. 5—Receiving and Transcribing a Voice Stream

FIG. 5 is a diagram 500 of receiving and transcribing a voice stream, in accordance with some implementations. FIG. 5 shows that user 202 produces statement 204, as shown in FIGS. 2-3. The statement 204 is provided to microphone 502, which turns the spoken statement into an acoustic signal. The acoustic signal is provided to a text recognition module 504 and to a metadata generation module 508.

The text recognition module 504 processes the acoustic signal and yields text 506 corresponding to the acoustic signal received from microphone 502. For example, in FIG. 5, the corresponding text 506 is "Hi, how are you doing?" The recognition module 504 may use a variety of speech recognition techniques to recognize the text 506. Speech recognition is also known as automatic speech recognition (ASR), computer speech recognition, or speech-to-text (STT).

In some implementations, the speech recognition may use hidden Markov models or neural networks. Another technique that may be used is dynamic time warping (DTW)-based speech recognition, but other techniques may have better performance. The text 506, once recognized, may be provided to metadata generation module 508.

Metadata generation module 508 may operate in a variety of ways. For example, Metadata generation module 508 may receive the acoustic signal from microphone 502 and may also receive the recognized text 506. Metadata generation module 508 may use such information to generate metadata that defines auditory properties to associate with the text.

The metadata has the form of metadata annotations to the text, associated with aspects of the text such as timing and auditory properties. For example, the metadata generation module 508 may include an acoustic analysis module 510 and a machine learning (ML) metadata prediction module 512. These components of the metadata generation module 508 may produce generated metadata 514.

The generated metadata 514 includes annotations that define aspects of the recognized text 506. For example, the generated metadata 514 may include one or more of timing annotations 516, volume annotations 518, pitch annotations 520, and other annotations 522. For example, in some implementations, the generated metadata 514 may include timing annotations 516, volume annotations 518, and pitch annotations 520. In other implementations, the generated metadata 514 includes timing annotations 516, volume annotations 518, and pitch annotations 520 as well as other annotations 522. In yet other implementations, the generated metadata 514 includes timing annotations 516 and other annotations 522 in addition to or instead of volume annotations 518, and pitch annotations 520. The timing annotations 516 may specify word and syllable boundaries. In some implementations, the timing annotations 516 capture time between words and/or syllables and time spent saying words and/or syllables.

The volume annotations 518 record volume changes over time. The pitch annotations 520 record pitch changes over time. The other annotations 522, which may be optional, may record other auditory aspects that correspond to the recognized text. For example, the other annotations 522 could include other prosodic attributes of the voice stream.

The volume annotations 518, the pitch annotations 520, and the other annotations 522 (if present) may be stored as key-value pairs. The value is stored as a curve that tracks the change in the value over time. For example, the "volume" metadata key may store how the volume changes over time. The text stream records time so that there is a direct correspondence between each word or syllable and the metadata for that word or syllable.

The metadata may be obtained in at least two ways. One way to obtain the metadata is by use of the acoustic analysis module 510. The acoustic analysis module 510 obtains metadata from acoustic properties of the original voice stream. For example, the acoustic analysis module 510 may consider the text 506 and use the text 506 to determine word and syllable boundaries to generate the timing annotations 516. In some implementations, the acoustic analysis module 510 may analyze signal properties of the original voice stream to further establish the timing annotations 516.

The acoustic analysis module 510 may also derive the volume annotations 518, the pitch annotations 520, and the other annotations 522 (if present) from the acoustic properties of the original voice stream. For example, the volume annotations 518 may be identified by considering intensity or sound pressure levels (measured in decibels (dBs)). The pitch annotations 520 may be identified by considering fundamental frequency (measured in hertz (Hz)). The other annotations 522 may be determined from other signal properties, such as spectral characteristics (distribution of energy at different parts of the audible frequency range).

As an alternative or a supplement, the metadata generation module 508 may obtain the generated metadata 514 using ML metadata prediction module 512 to process the received text 506. For example, ML metadata prediction module 512 may have been trained on metadata generated for a user by an acoustic analysis module 510. For example, the ML metadata prediction module 512 may learn that, for a given user, that given received text maps to certain timing annotations 516, volume annotations 518, pitch annotations 520, and other annotations 522.

Thus, in some implementations, metadata generation module 508 receives the received text 506 and is aware of an identity of a user. Based on the user's identity, the metadata generation module 508 may select the ML metadata prediction module 512 trained for that user, which may take the received text 506 and generate appropriate generated metadata 514. Using this predictive approach may provide a bandwidth improvement, in that it may be faster to use the trained ML metadata prediction module 512 to generate the generated metadata 514, obviating the need to perform acoustic analysis on every voice stream.

Thus, once the metadata is obtained, the metadata characterizes times at which tokens such as words or syllables are uttered, as well as times between the tokens. The metadata also characterizes auditory properties of the speech. These auditory properties may be used to reconstruct the original voice stream so that the reconstructed voice stream has these properties, but cannot be traced back to the identity of the user.

Figure 6A:
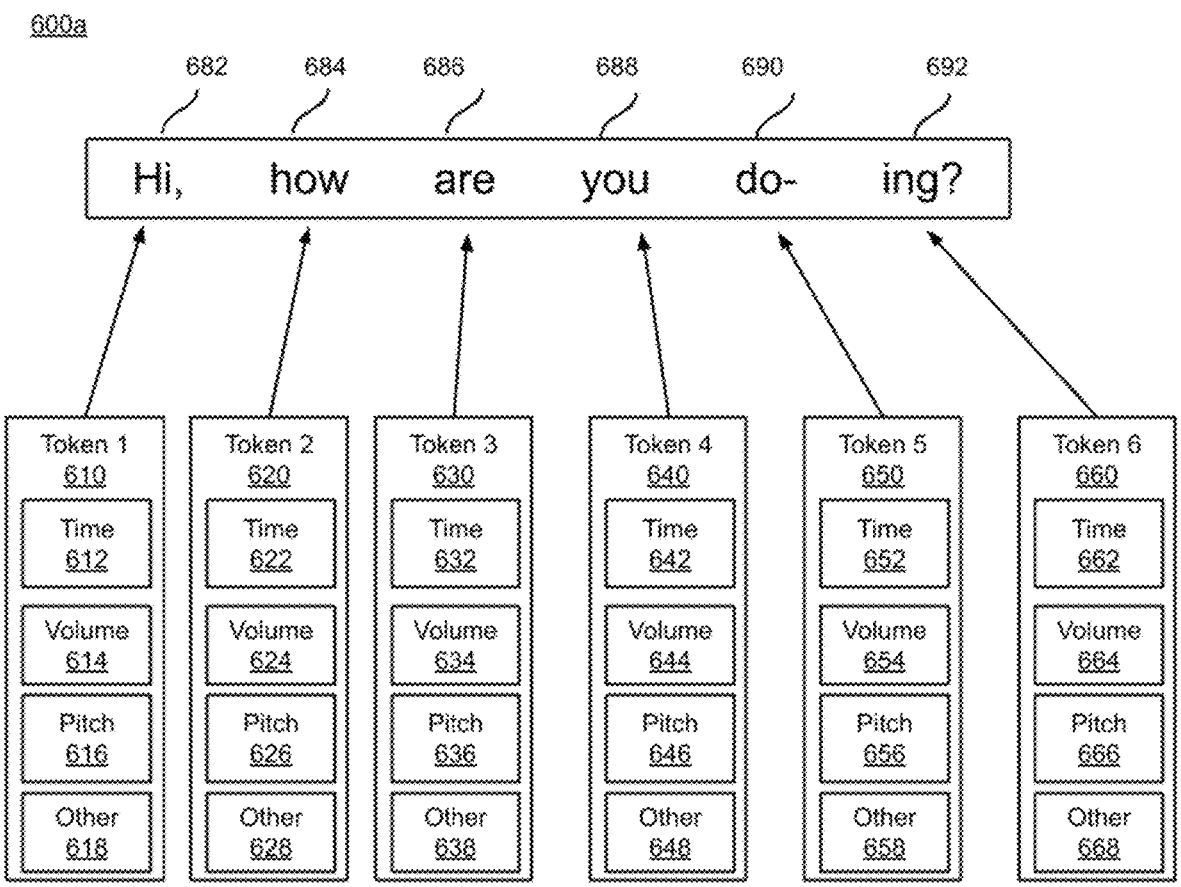
FIG. 6A is a diagram of associating metadata with tokens from a voice stream, in accordance with some implementations.

FIG. 6A—Associating Metadata with Tokens

FIG. 6A is a diagram 600*a* of associating metadata with tokens from a voice stream, in accordance with some implementations. For example, FIG. 6 shows a phrase, "Hi, how are you doing?" The phrase is divided into token 1 682 "Hi," token 2 684 "how" token 3 686 "are" token 4 688 "you" token 5 690 "do-" and token 6 692 "ing?" The term "token" is used herein to refer to a discrete portion of the spoken voice stream. A token may refer to a word, a syllable, or a chunk of syllables.

Token 1 682 is associated with token 1 metadata 610, which includes time data 612, volume data 614, pitch data 616, and may include other data 618. Token 2 684 is associated with token 2 metadata 620, which includes time data 622, volume data 624, pitch data 626, and may include other data 628. Token 3 686 is associated with token 3 metadata 630, which includes time data 632, volume data 634, pitch data 636, and may include other data 638. Token 4 688 is associated with token 4 metadata 640, which includes time data 642, volume data 644, pitch data 646, and may include other data 648. Token 5 690 is associated with token 5 metadata 650, which includes time data 652, volume data 654, pitch data 656, and may include other data 658. Token 6 692 is associated with token 6 metadata 660, which includes time data 662, volume data 664, pitch data 666, and may include other data 668.

Each metadata includes time metadata annotations, volume metadata annotations, pitch metadata annotations, and possibly other metadata annotations. For example, the time metadata annotations may include a time at which the associated token began being spoken and a time at which the associated token was completed being spoken. Alternatively, the time metadata annotations may include a time at which the associated token began being spoken and a duration of the associated token. As another example, the time metadata annotations may include a time at the midpoint of the token being spoken, and optionally a duration of the associated token.

The volume may include an intensity or a sound pressure level in decibels, or another scale that is used for the volume metadata. The pitch may include a fundamental frequency measure measured in hertz, or another scale that is used for the pitch metadata. Other metadata may include information that stores values in appropriate units to track the quantity being measured over time.

Figure 6B:
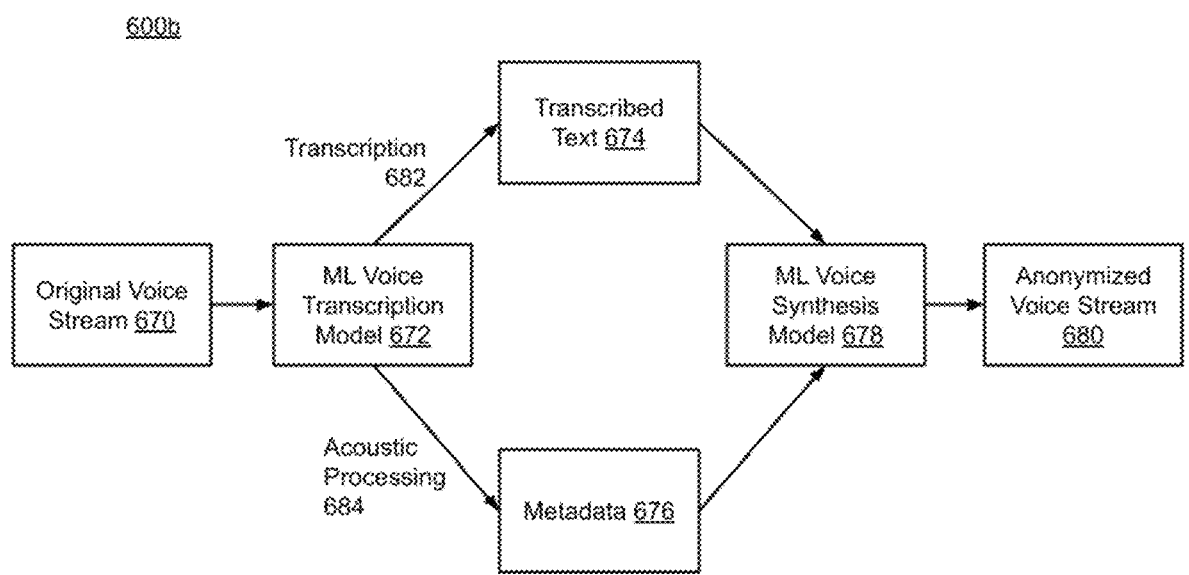
FIG. 6B is a diagram of transforming a voice stream using acoustic processing, in accordance with some implementations.

FIG. 6B—Transforming Voice Stream Using Acoustic Processing

FIG. 6B is a diagram 600b of transforming a voice stream using acoustic processing, in accordance with some implementations. The transformation begins with an original voice stream 670. The original voice stream 670 is provided as input to ML voice transcription model 672. In some implementations, the ML voice transcription model 672 is a hidden Markov model, and in some implementations, the ML voice transcription model 672 is a neural network model.

The original voice stream 670 may be preprocessed before recognition by the ML voice transcription model 672. For example, the preprocessing may adapt the original voice stream 670 for recognition using a hidden Markov model or a neural network, depending on the approach that is used in the ML voice transcription model 672.

In FIG. 6B, the ML voice transcription model 672 performs two tasks, transcription 682 and acoustic processing 684. The transcription 682 generates transcribed text 674 and the acoustic processing 684 generates metadata 676 by analyzing acoustic characteristics of the original voice stream 670, such as word or syllable timing, volume, pitch, and other characteristics.

The transcribed text 674 and metadata 676 may be provided to a machine learning (ML) voice synthesis module 678. The machine learning voice synthesis module 678 may use a text-to-speech model, such as deep learning trained based on samples, to generate an anonymized voice stream 680 that corresponds to transcribed text 674, and has the characteristics included in metadata 676. However, the anonymized voice stream 680 no longer has speech characteristics that enable identification of the speaker of the original voice stream 670, thus protecting privacy of the speaker.

Figure 6C:
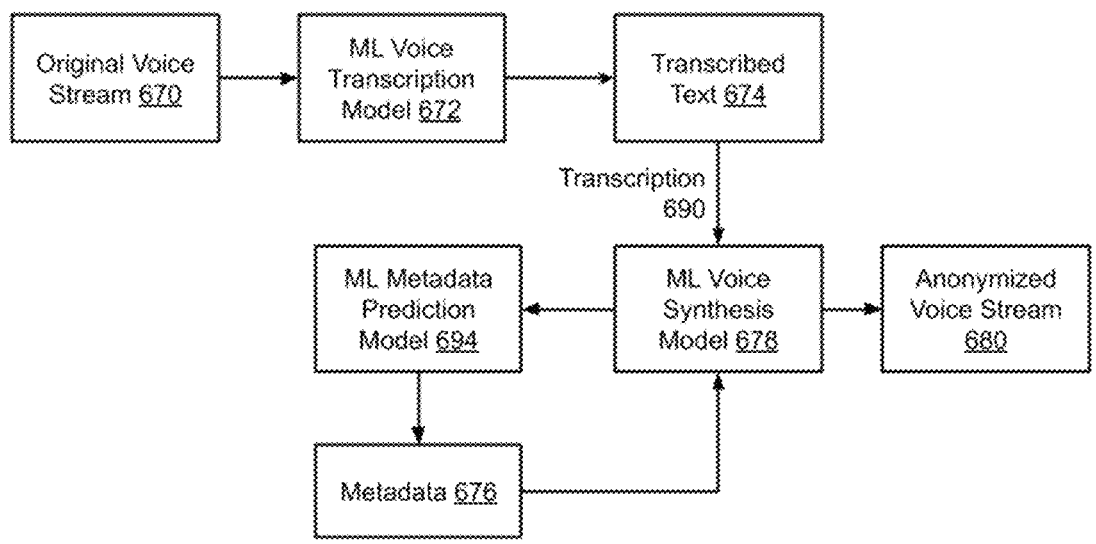
FIG. 6C is a diagram of transforming a voice stream using a metadata prediction model, in accordance with some implementations.

FIG. 6C—Transforming Voice Stream Using Metadata Prediction Model

FIG. 6C is a diagram 600c of transforming a voice stream using a metadata prediction model, in accordance with some implementations. The transformation begins with an original voice stream 670. The original voice stream 670 is provided as input to ML voice transcription model 672. In some implementations, the ML voice transcription model 672 is a hidden Markov model, and in other implementations, the ML voice transcription model 672 is a neural network model.

The original voice stream 670 may be preprocessed before recognition by the ML voice transcription model 672. For example, the preprocessing may adapt the original voice stream 670 for recognition using a hidden Markov model or a neural network, depending on which approach is used in the ML voice transcription model 672.

In FIG. 6C, the ML voice transcription model 672 performs only one task, transcription 690. The transcription 690 generates transcribed text 674 and the transcribed text 674 is provided to a machine learning (ML) voice synthesis model 678. The ML voice synthesis model 678 also has access to an identity of a user. The ML voice synthesis model 678 provides the transcribed text 674 and the user identity to a machine learning (ML) metadata prediction model 692.

The ML metadata prediction model 692 is trained to map text for a given user to given metadata, based on previous examples found using acoustic processing. The ML metadata prediction model 694 takes the transcribed text 674 as input along with information about the identity of the user and generates metadata 676. For example, the information may include information about a specific voice for the user, such as vocal properties for the user. Such information allows the ML metadata prediction model 694 to generate appropriate metadata for the transcribed text 674. The generated metadata 676 is provided by the ML metadata prediction model 694 to the ML voice synthesis model 678.

The machine learning voice synthesis module 678 may use a text-to-speech model, such as deep learning trained based on samples, to generate an anonymized voice stream 680 that corresponds to transcribed text 674, and has the characteristics included in metadata 676, obtained in FIG. 6C from the ML metadata prediction model 694, obviating the need for acoustic analysis of the original voice stream 670. However, the anonymized voice stream 680 no longer has speech characteristics that would allow identification of the speaker of the original voice stream 670.

Figure 7A:
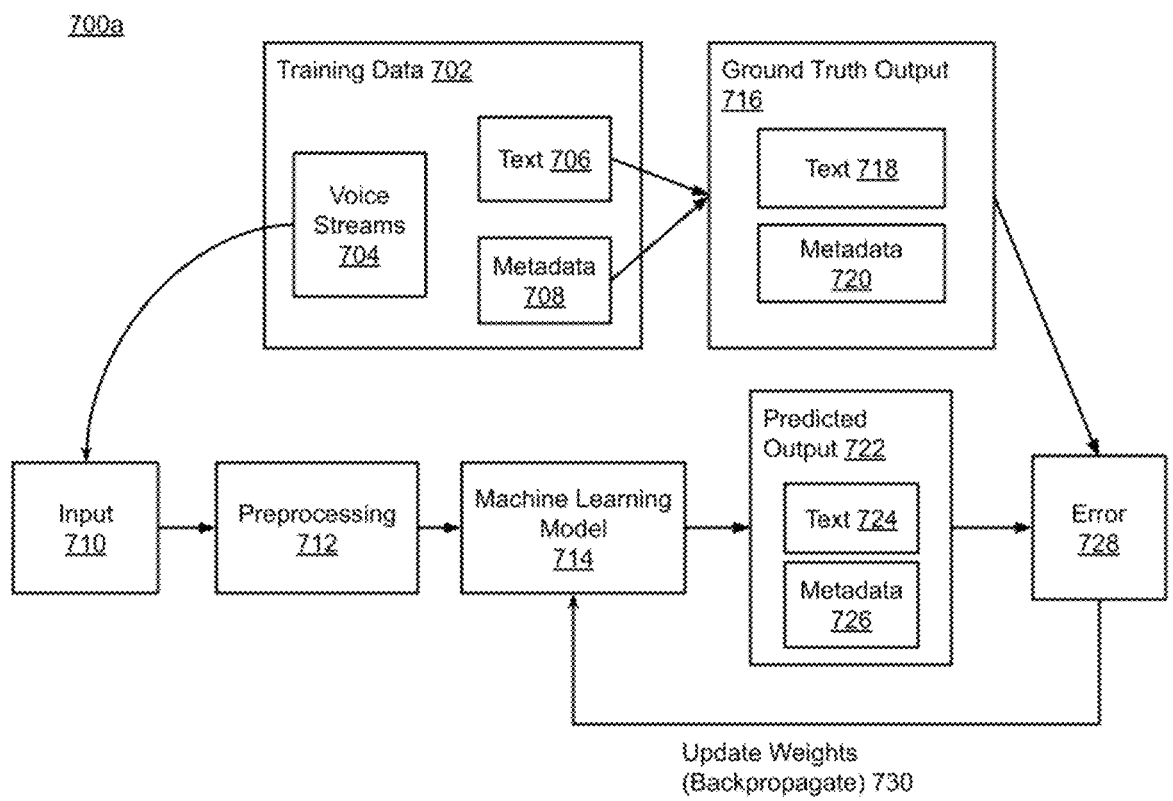
FIG. 7A is a diagram of an example of training a machine learning model using metadata, in accordance with some implementations.

FIG. 7A—Training a Machine Learning Voice Transcription Model Using Metadata

FIG. 7A is a diagram 700a of an example of training a machine learning voice transcription model using metadata, in accordance with some implementations. FIG. 7A shows a machine learning model 714. The machine learning model 714 takes as input a vector that represents acoustic data. The acoustic data corresponds to a voice stream received from a user using a sound capture device such as a microphone. The output of machine learning model 714 may be recognized text that corresponds to the voice stream.

As part of the recognition process, the machine learning model 714 breaks the recognized text into tokens. For example, the tokens may be words or syllables, or chunks of syllables. The tokens may be labeled in association with time information, including metadata annotations. The machine learning model may also associate metadata annotations with the recognized tokens. Such metadata annotations may be volume, pitch, and so on. The metadata allows a machine learning voice synthesis model to replicate characteristics of the original voice stream, but with the aspects that would otherwise reveal a speaker's identity removed.

FIG. 7A shows how the machine learning model 714 is trained to effectively perform speech recognition and metadata association. For example, FIG. 7A shows that there may be a repository of training data 702 for the machine learning model 714. The training data 702 may include voice streams 704 and corresponding recognized text 706 and metadata 708.

The recognized text 706 may be divided into tokens (e.g., words, syllables, chunks of syllables), where the tokens are associated with corresponding metadata 708. Thus, the voice streams 704 in the training data 702 are stored in association with corresponding text 706 and metadata 708, with the intention that the machine learning model 714 may be able to learn how to take a raw voice stream in the future and automatically associate the future voice stream with correct corresponding text and metadata.

For example, the voice streams 704 from the training data 702 are provided as an input data set 710 in FIG. 7A. The input data set 710 goes through preprocessing 712 so that the input data set 710 is ready for machine learning model 714. For example, the preprocessing 712 may include steps such as speech pre-emphasis, vocal tract length normalization, voice activity detection, noise removal, framing, and windowing.

The preprocessing 712 may transform the data in ways such that the data set is suitable for transcription and analysis by machine learning model 714. For example, when training the machine learning model 714, the machine learning model 714 produces predicted output 722 for each instance of a voice stream for an input 710.

Each predicted output 722 may include predicted text 724 and predicted metadata 726. Such predicted text 724 and predicted metadata 726 may be compared to a ground truth output 716. The ground truth output 716 includes ground truth text 718 and ground truth metadata 720.

Hence, by comparing the ground truth output 716 with the predicted output 722, it may be possible to generate an error 728 that expresses how the predicted output 722 differs from the ground truth output 716. By using the error 728 to modify the machine learning model 714, the training may update weights 730 for the machine learning model 714, thereby improving the performance of the machine learning model 714.

For example, if the machine learning model 714 is a neural network, the updating weights 730 may include updating weights 730 of one or more nodes of the neural network in the machine learning model 714. In some implementations, the updating weights 730 may involve backpropagation. For example, backpropagation may use a method such as gradient descent to minimize the error 728.

The training data 702 may be adapted for a particular user. For example, the voice streams 704 may correspond to corresponding text 706 and metadata 708 for a particular user, such that the machine learning model 714 learns to associate voice streams 704 for a given user with corresponding text 706 and metadata 708 for that user. Based on such training, the machine learning model 714 learns to perform well for each particular user.

FIG. 7A shows training for a neural network speech recognition model. However, it may also be possible to use a hidden Markov model for speech recognition. A hidden Markov model is trained in a slightly different manner. Implementation of a hidden Markov model includes defining the state space and the observation space, defining the initial state distribution, defining the state transition probabilities, defining the observation likelihoods, training the model, such as by using the Baum-Welch algorithm or the forward-backward algorithm, decoding a most likely series of states, and measuring the model performance.

It may also be possible to use another model or technique for acoustic analysis to obtain metadata. Such techniques may include waveform analysis, Fast Fourier Transform (FFT) or Linear Predictive Coding (LPC) analysis, voice onset time (VOT) measurements, formant frequency measurements, and so on.

Figure 7B:
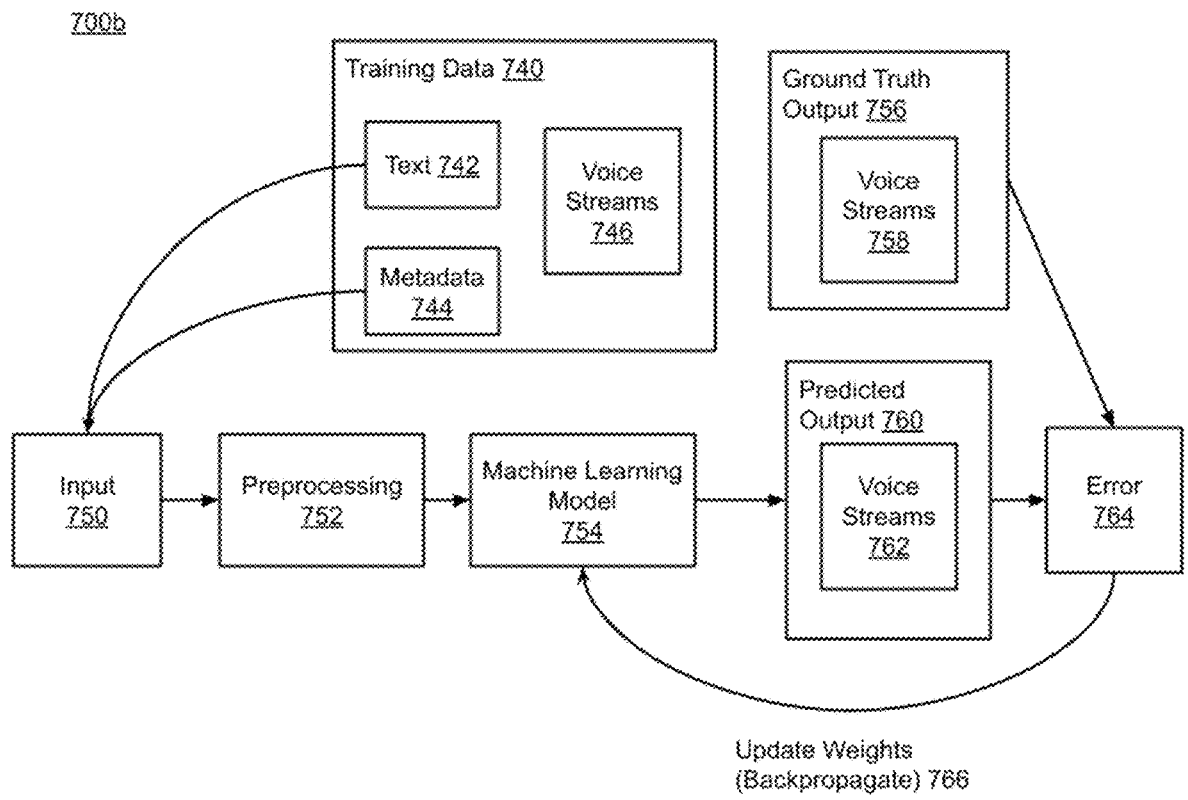
FIG. 7B is a diagram of an example of training a machine learning model using metadata, in accordance with some implementations.

FIG. 7B—Training a Machine Learning Voice Synthesis Model Using Metadata

FIG. 7B is a diagram 700*b* of an example of training a machine learning model using metadata, in accordance with some implementations. The machine learning model 754 is trained to perform the opposite task of the machine learning model 714 in FIG. 7A. Specifically, the machine learning model 754 takes text and metadata from a transcription machine learning (ML) model and optionally a ML metadata prediction model and generates a corresponding voice stream.

FIG. 7B shows a machine learning model 754. The machine learning model 754 takes as input a vector that represents text data corresponding to the recognized content of a voice stream received from a user using a sound capture device such as a microphone. The output of machine learning model 754 may be a voice stream that corresponds to the text.

As part of the recognition process, the machine learning model 754 processes the text as tokens. For example, the tokens may be words, syllables, or chunks of syllables. The tokens may be labeled in association with time information, The machine learning model 754 may also have access to metadata associated with the recognized tokens. Such metadata may be volume, pitch, and so on. The metadata allows a machine learning voice synthesis model to replicate characteristics of the original voice stream, but with the aspects that would otherwise reveal a speaker removed.

FIG. 7B shows how the machine learning model 754 is trained to effectively perform voice synthesis. For example, FIG. 7B shows that there may be a repository of training data 740 for the machine learning model 754. The training data 740 may include recognized text 742 and metadata 744 and corresponding voice streams 746.

The recognized text 742 may be associated with tokens, where the tokens are associated with corresponding metadata 744. Thus, the text 742 and metadata 744 in the training data 740 are stored in association with corresponding voice streams 746, with the intention that the machine learning model may be able to learn how to take text and metadata and automatically associate the voice stream with correct corresponding text and metadata.

For example, the text 742 and metadata 744 from the training data 740 are provided as an input data set 750. The input data set 750 goes through preprocessing 752 so that the input data set 750 is ready for machine learning model 754. For example, the preprocessing 752 may include parsing the text 742 so that the text 742 is ready for conversion into a voice stream. For example, the parsing may include dividing the text 742 into tokens, so that the machine learning model 754 may have access to the tokens as a basis of synthesizing the text. The preprocessing 752 may also involve associating the metadata 744 with the tokens.

For example, when training the machine learning model 754, the machine learning model 754 produces predicted output 760 for each instance of text and metadata for an input 750.

Each predicted output 760 may include predicted voice streams 762. Such predicted voice streams 762 may be compared to a ground truth output 756. The ground truth output 756 includes ground truth voice streams 758. Here, ground truth voice streams 758 are voice streams that would be a valid voice stream corresponding to input 750. Hence, by comparing the ground truth output 756 with the predicted output 760, it may be possible to generate an error 764 that expresses how the predicted output 760 differs from the ground truth output 756.

Hence, by using the error 764 to modify the machine learning model 754, the training may update weights 766 for the machine learning model 754, thereby improving the performance of the machine learning model 754. For example, if the machine learning model 754 is a neural network, the updating weights 766 may include updating weights 766 in the machine learning model 754. In some implementations, the updating weights 766 may involve backpropagation.

For example, backpropagation may use a method such as gradient descent to minimize the error 764 produced when machine learning model 754 is provided with training data 740. The training data 740 may be adapted for a particular user. For example, the text 742 and metadata 744 may all be derived for a particular user, so that the machine learning model 754 performs well for that particular user. For example, the text 742 may be provided for synthesis along with a user's identity, and a ML metadata prediction module may generate the metadata from such information without the need for analyzing acoustic aspects of the original voice stream to generate the metadata.

Figure 8:
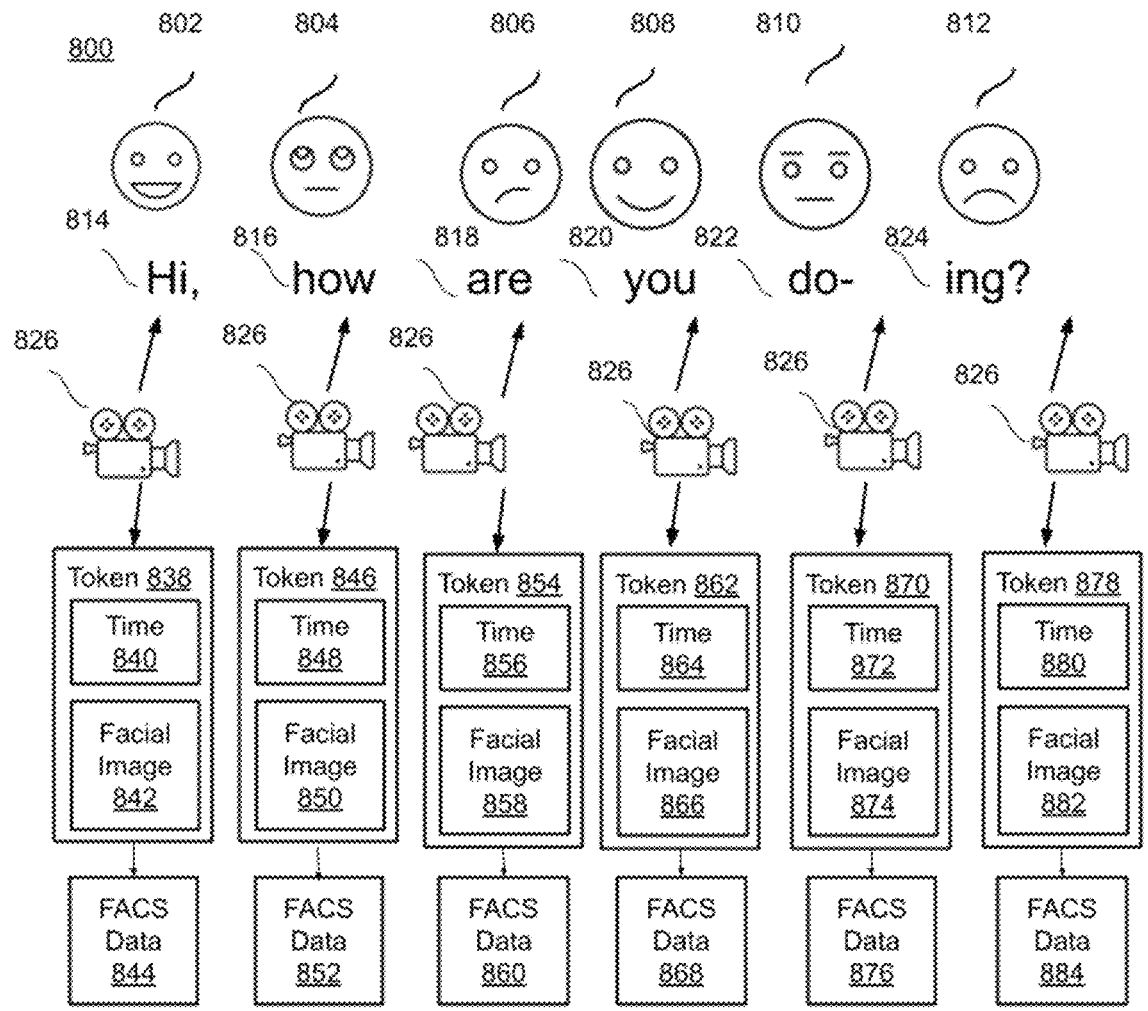
FIG. 8 is a diagram of an example of capturing facial images with user permission and generating FACS data, in accordance with some implementations.

FIG. 8—Capturing Facial Images and Generating FACS Data

FIG. 8 is a diagram 800 of an example of capturing facial images with user permission and generating FACS data, in accordance with some implementations. For example, FIG. 8A shows that as a user speaks, the user may have a variety of facial expressions. For example, the user may have expression 1 802, expression 2 804, expression 3 806, expression 4 808, expression 5 810 and expression 6 812.

Each of these expressions may map to a token uttered as the user has that expression. For example, expression 1 802 maps to token 1 814 "Hi,", expression 2 804 maps to token 2 814 "how", expression 3 806 maps to token 3 814 "are", expression 4 808 maps to token 4 814 "you", expression 5 810 maps to token 5 814 "do-", and expression 6 812 maps to token 6 814 "ing."

At each token, with user permission, a camera 826 records one or more images based on the user's facial expression. For example, camera 826 records token information 1 838 including time data 840 and a facial image 842. The facial image 842 is converted into FACS data 844, which provides information about the facial image 842 that allows for reconstruction of expression 1 802, such as in an animation.

Camera 826 records token information 2 846 including time data 848 and a facial image 850. The facial image 850 is converted into FACS data 852, which provides information about the facial image 850 that allows for reconstruction of expression 2 804, such as in an animation. Camera 826 records token information 3 854 including time data 856 and a facial image 858. The facial image 858 is converted into FACS data 860, which provides information about the facial image 858 that allows for reconstruction of expression 3 806, such as in an animation. Camera 826 records token information 4 862 including time data 864 and a facial image 866. The facial image 866 is converted into FACS data 868, which provides information about the facial image 866 that allows for reconstruction of expression 4 808, such as in an animation.

Camera 826 records token information 5 870 including time data 872 and a facial image 874. The facial image 874 is converted into FACS data 876, which provides information about the facial image 874 that allows for reconstruction of expression 5 810, such as in an animation. Camera 826 records token information 6 878 including time data 880 and a facial image 882. The facial image 882 is converted into FACS data 884, which provides information about the facial image 882 that allows for reconstruction of expression 6 812, such as in an animation. Thus, the stored FACS data captures how a facial expression changes over time as the user utters tokens in a voice stream in a compact manner.

Figure 9:
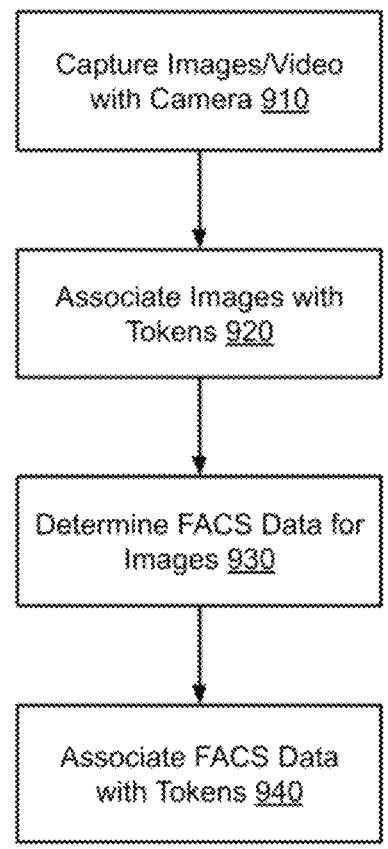
FIG. 9 is a flowchart of an example method for capturing facial images and associating them with FACS data, in accordance with some implementations.

FIG. 9—Method of Capturing and Associating Facial Images

FIG. 9 is a flowchart 900 of an example method for capturing facial images and associating them with FACS data, in accordance with some implementations.

In block 910, images and/or video are captured using a camera. Block 910 may be followed by block 920.

In block 920, the captured images are associated with tokens. For example, there may be a voice stream that is processed by a machine learning (ML) transcription model. The ML transcription model may determine when words and syllables are being uttered and when there are gaps between words. Hence, when a given word or syllable is being uttered, the image for that token may be associated with an image captured at that time. Block 920 may be followed by block 930.

In block 930, Facial Action Coding System (FACS) data is determined for the images. The FACS data may include information about action units (AUS), action descriptors (ADs), and intensity scoring. This information indicates how different portions of a face move, such as based on emotional reactions. Block 930 may be followed by block 940.

In block 940, the FACS data for the images may be associated with the tokens. For example, the images have FACS data associated with them, and the FACS data for the image corresponding to a token at the time the image was captured. Block 940 may be followed by using the associated FACS data.

For example, by associating a token from the voice stream with an appropriate time, an image from that time may be associated with the FACS data. By having the FACS data available, it is enough to send the FACS data, rather than having to send the image. The FACS data allows for creation of an animation that may include movements similar to those of the original speaker, when reconstituting the voice stream.

Figure 10:
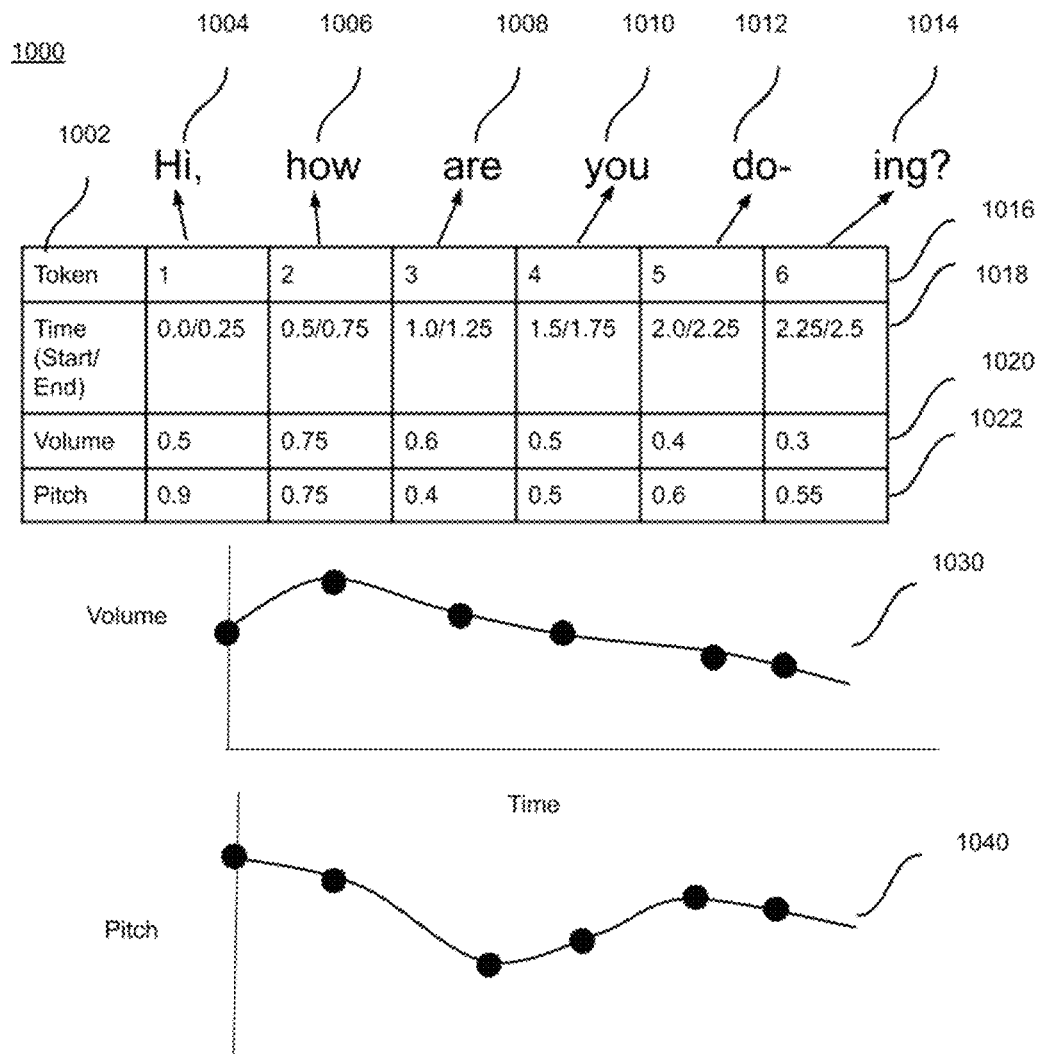
FIG. 10 is a diagram showing how metadata may change over time, in accordance with some implementations.

FIG. 10—Changes in Metadata Over Time

FIG. 10 is a diagram 1000 showing how metadata may change over time, in accordance with some implementations. For example, table 1002 shows metadata associated with points in time during a sentence spoken by a user. For example, table 1002 shows token values 1016, time values 1018, volume values 1020, and pitch values 1022. However, these are merely representative values, and other values are possible.

For example, token values 1016 each correspond to time values 1018, a volume value 1020, and a pitch value 1022. For example, the time values identify a start time and an end time for each token. In this example, each of the first 5 tokens begins at 0.5-second intervals and lasts 0.25-seconds. However, the example of FIG. 10 is intended merely as an illustrative example.

In other implementations, the tokens may have different durations and different gaps between tokens. Also, rather than specifying a start time and an end time, in some implementations, there may be a start time and a duration value. In some implementations, it may be possible to only record a start time for speaking a token and use the length of the token to infer a duration. For example, the token "I" may be assumed to have a shorter duration than the token "Fabulous."

For example, at time=0.0 to time 0.25, the user utters token 1 1004 "Hi," with volume 0.5 and pitch 0.9. Then, at time=0.5 to time 0.75, the user utters token 2 1006 "how" with volume 0.75 and pitch 0.75. Then, at time=1.0, the user utters token 3 1008 "are" with volume 0.6 and pitch 0.4. Then, at time=1.5 to time 1.75, the user utters token 4 1010 "you" with volume 0.5 and pitch 0.5.

Then, at time=2.0 to time 2.25, the user utters token 5 1012 "do-" with volume 0.4 and pitch 0.6. Then, at time=2.25 to time 2.5, the user utters token 6 1014 "ing?" with volume 0.3 and pitch 0.55. It may be noted that there is no break between token 5 1012 and token 6 1014 because they are part of the same word. At each token value 1016, there are corresponding time value(s) 1018, volume value 1020, and pitch value 1022.

Thus, the volume values 1020 and the pitch values 1022 are associated with tokens 1016, based on the volume values 1020 and the pitch values 1022, as well as the time values 1018 that specify when given tokens are being uttered (and breaks between tokens).

FIG. 10 also shows a graph 1030 of how volume changes over time, and a graph 1040 of how pitch changes over time. The scales of graph 1030 include time on the X-axis and values scaled between 0 and 1 on the Y-axis.

However, the values are not limited to being scaled in this manner. For example, the volume values 1020 may be measured in appropriate units, such as decibels (dB). For example, the pitch values 1022 may also be measured in appropriate units, such as hertz (Hz). In the example of FIG. 10, the example is simplified for purposes of illustration, but the metadata may include additional information that relates timing, volume, pitch, and any other metadata to the tokens for use when generating the anonymized voice stream.

Graph 1030 includes points associated with particular volumes for each token. Graph 1040 includes points associated with particular pitches for each token. In some implementations, the points are connected with a smooth curve. However, other ways of connecting the points are possible, such as line segments. The curve may be used when synthesizing the anonymized voice stream, such that aspects of the original tokens may be applied to the textual content of the tokens.

FIG. 10 shows tracking the volume and pitch as the metadata associated with the tokens. Such metadata may be stored as key-value pairs. For example, a given word/syllable is associated with a corresponding time value. By using the "volume" metadata key, the volume for that word/syllable may be accessed. Similarly, by using the "pitch" metadata key, the pitch for that word/syllable may be accessed. In some implementations, the metadata may be limited to volume and pitch. However, using other metadata may be possible in other implementations.

Figure 11:
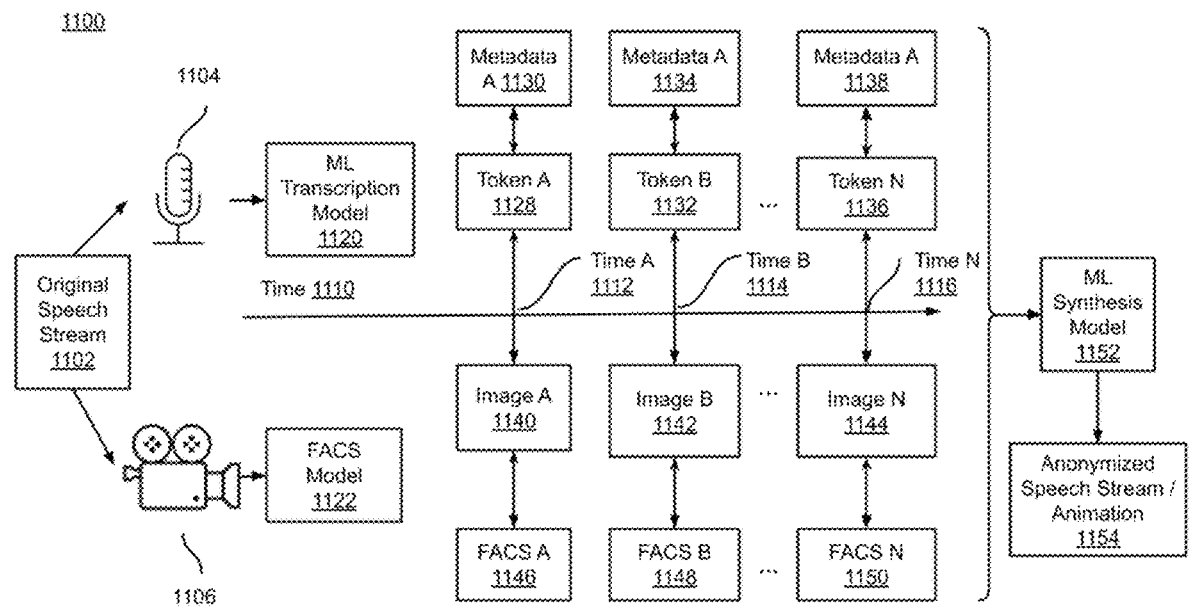
FIG. 11 is a diagram showing how a voice stream may be associated with tokens, metadata, images, and FACS data, in accordance with some implementations.

FIG. 11—Voice Stream Associated with Tokens, Metadata, Images, and FACS Data FIG. 11 is a diagram 1100 showing how a voice stream may be associated with tokens, metadata, images, and FACS data, in accordance with some implementations. For example, the original input to the system may be an original speech stream 1102. As the user speaks, the original speech stream 1102 may include content (i.e., text corresponding to what the user says).

The original speech stream 1102 may also have auditory properties, such as volume and pitch. The original speech stream 1102 in its original form also includes a voice print that, without modification, could allow identification of the speaker. As discussed above, this situation presents a privacy hazard, especially with respect to users whose privacy is important due to safety and regulatory issues. Also, the user's face may move in a certain manner corresponding to the way in which that user's facial muscles move as the user speaks. In particular, the user's lips may take on certain shapes corresponding to the words the user speaks in the original speech stream 1102.

For example, a microphone 1104 records an audio stream corresponding to the original speech stream 1102, as time 1110 passes. Likewise, a camera 1106 captures a video stream and/or still pictures of the user as time 1110 passes. For example, microphone 1104 provides the captured audio into machine learning (ML) transcription model 1120. While not explicitly shown, there may be a preprocessing step that takes the audio stream and transforms the audio stream into a vector or another format that is suitable for transcription by the ML transcription model 1120.

For example, the ML transcription model 1120 produces a series of tokens over time 1110. For example, there may be token A 1128, token B 1132, up to token N 1136, where N is an integer number of tokens. Each token may be associated with metadata, such as metadata A 1130, metadata B 1134, and metadata N 1138. The metadata may be based on acoustic analysis of the original speech stream 1102 or recognized text and a user's identity. Each token may be associated with a corresponding time, such as time A 1112, time B 1114, up to time N 1116. Time data may be part of the metadata, as well as auditory properties of each token. The metadata may be stored in association with the text as metadata annotations, where the annotations define key-value pairs.

At each time at which a token occurs along time 1110, a corresponding image may be captured by camera 1106, specifically image A 1140, image B 1142, up to image N 1144. Each of the images may be associated with FACS data by processing the output of camera 1106 using a FACS model 1122 that takes an image and transforms it into FACS data. For example, image A 1140 is associated with time A 1112 and FACS data A 1146. Image B 1142 is associated with time B 1114 and FACS data B 1148. Image N 1144 is associated with time N 1116 and FACS data N 1150.

While the FACS data is shown as being associated with the images, in some implementations, the FACS data is linked to particular times and their corresponding tokens. The linkage may use metadata annotations. If these metadata annotations are available, it may be possible to associate the FACS data with portions of text.

All of the information about the text, the derived tokens, their associated metadata, and the images and FACS data may be provided as input to a machine learning (ML) synthesis model 1152. Based on this information, the ML synthesis model 1152 produces an anonymized signal with an animation 1154.

Thus, FIG. 11 shows taking an original speech stream 1102, capturing the original speech stream 1102 using a microphone 1104 as corresponding images are captured using a camera 1106, transcribing the original speech stream into text associated with tokens and metadata over time, and associating the text with images and corresponding FACS data. Such information may be used to generate an anonymized speech stream and accompanying animation.

Figure 12:
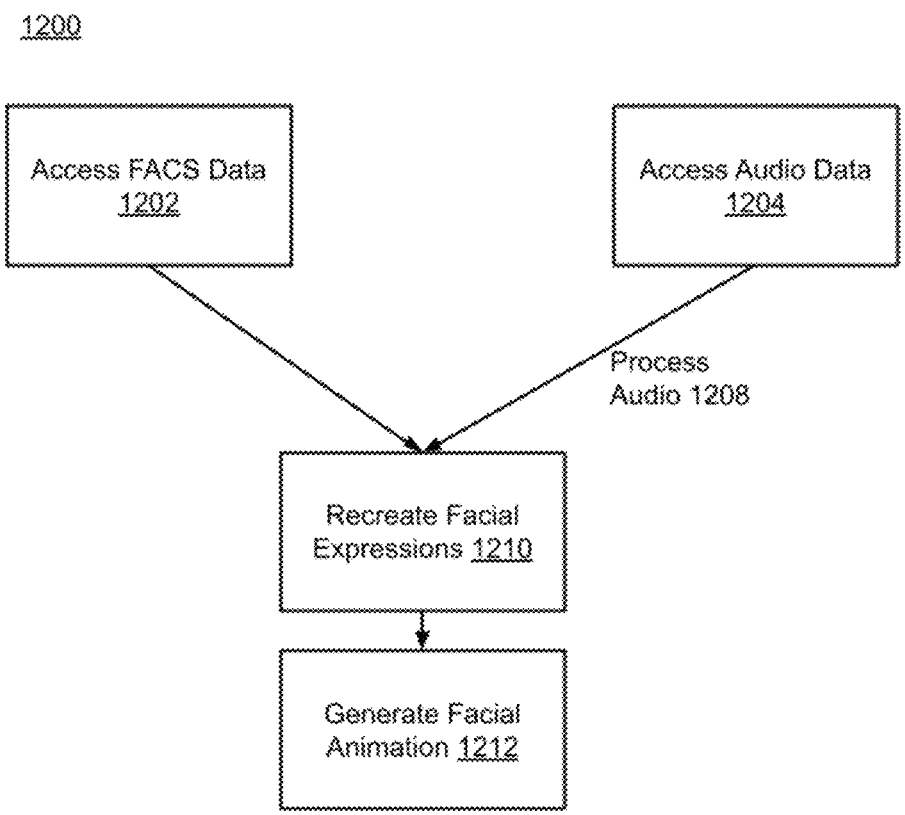
FIG. 12 is a flowchart of an example method for recreating facial expressions, in accordance with some implementations.

FIG. 12—Recreating Facial Expressions

FIG. 12 is a flowchart 1200 of an example method for recreating facial expressions, in accordance with some implementations. FIG. 12 shows that there may be Facial Action Coding System (FACS) data 1202. The FACS data 1202 is derived from analyzing images taken as a user speaks words.

The FACS data 1202 can be used to recreate a facial expression 1210. It may also be possible to consider the raw audio data 1204 when recreating the facial expression 1210. By processing the audio 1208, the audio data 1204 may also indicate how a user's face looks when the animation is recreating the user's spoken text. In particular, processing the audio 1208 may indicate how a user's lips move when speaking.

Thus, FACS data 1202 and/or processed audio data 1204 may indicate what a user's face is supposed to look like at specific points in time as the user utters certain words and syllables. The FACS data 1202 may be processed, along with the audio data 1204 to generate animations that are representative not only of the words being articulated, but what a particular user's face looked like as they said those words. For example, the FACS data 1202 and/or the processed audio data 1204 allow the recreation of facial expressions 1210 at points in time associated with the tokens.

Then, it may be possible to generate a facial animation 1212 by providing a transition between the defined facial expressions associated with specific tokens. For example, the facial animation 1212 may be provided for a user's avatar. The facial animation may cause the user's lips to move in a way that is realistic and resembles the way the user originally spoke. In addition to lip movements, other portions of a user's face such as eyebrows, nose, and cheeks may be included in the facial animation. For example, such movements may be recorded in the FACS data as information about action units (AUs) and action descriptors (ADs), with associated intensity scoring.

Figure 13:
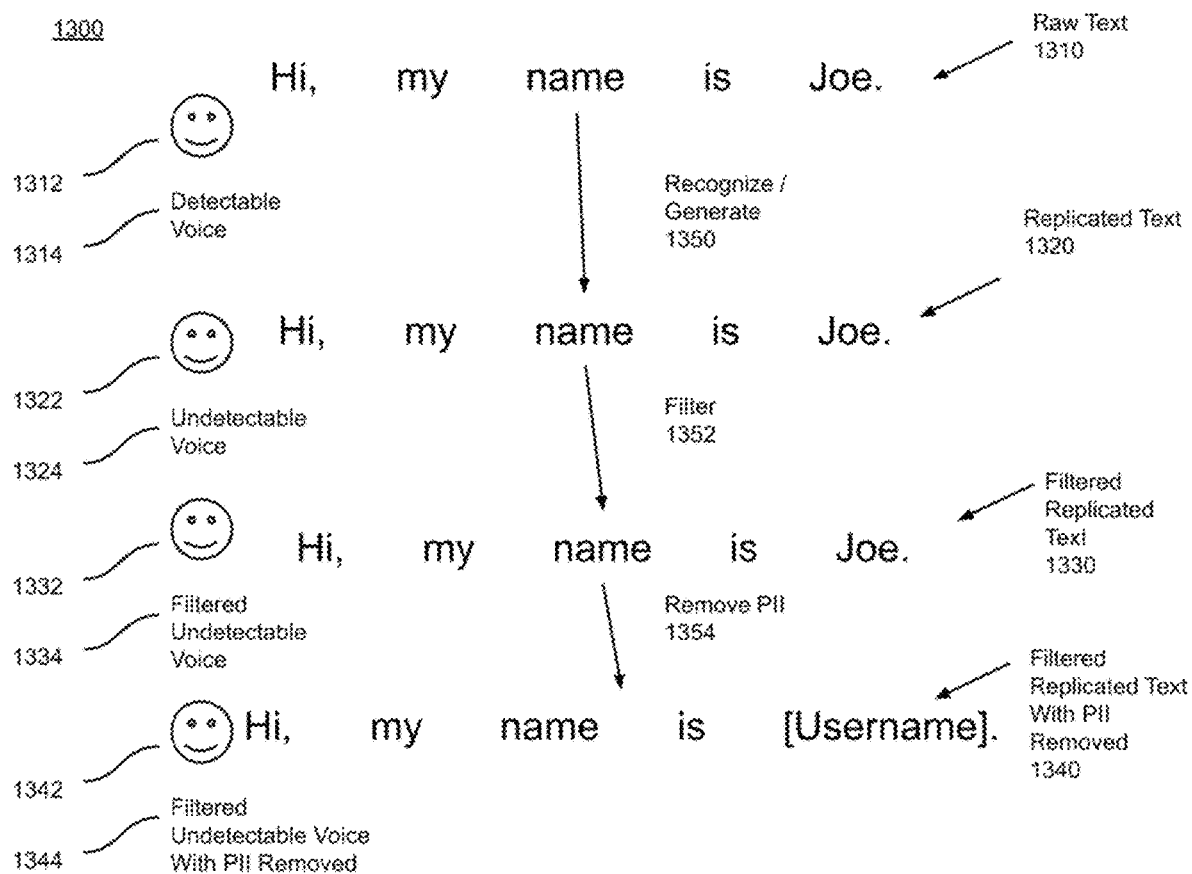
FIG. 13 is a diagram showing stages of transforming a voice stream, in accordance with some implementations.

FIG. 13—Stages of Voice Stream Transformation

FIG. 13 is a diagram 1300 showing stages of transforming a voice stream, in accordance with some implementations. For example, FIG. 13 shows raw text 1310, replicated text 1320, filtered replicated text 1330, and filtered replicated text with PII removed 1340.

Raw text 1310 includes the utterance, "Hi, my name is Joe." The raw text 1310 is accompanied by a series of photos of the utterer 1312 and the raw text 1310 is associated with a detectable voice 1314. It may be appropriate to process the raw text 1310 to minimize the inclusion of PII. For example, the raw text 1310 may be provided to a recognize/generate process 1350 to generate replicated text 1320, so that the voice stream is undetectable. Such voice stream processing may increase user safety.

Replicated text 1320 still includes the utterance, "Hi, my name is Joe." The replicated text 1320 is accompanied by an animation of the utterer 1322 and the replicated text 1320 is associated with an undetectable voice 1324. The animation of the utterer 1322 may be derived from FACS data based on anonymized images and/or analysis of the original voice stream. Hence, replicating the text in this manner minimizes the inclusion of PII. However, a user may wish to further filter the replicated text 1320 by providing the replicated text 1320 to a filtering process 1352 to generate filtered replicated text 1330. Such filtering may further distinguish the initial anonymized voice stream from the original voice stream.

For example, filtered replicated text 1330 still includes the utterance, "Hi, my name is Joe." The filtered replicated text 1330 is accompanied by an anonymized animation of the utterer 1332 (which may be updated based on the filtering 1352) and the filtered replicated text 1330 is associated with a filtered undetectable voice 1334.

However, it may still be appropriate to provide the filtered replicated text 1330 to a remove PII operation 1354. The remove PII operation 1354 may generate filtered replicated text with PII removed 1340. The animation 1342 may be further altered to conform with the filtering, in that removing the PII may affect the text itself.

For example, filtered replicated text with PII removed 1340 includes the utterance, "Hi, my name is [Username]."

Here, the word "Joe" has been replaced by the placeholder "[Username]." In some implementations, the word may be muted/masked, a beep may be overlaid to obfuscate the word, a different word substituted, etc. to protect user privacy. The filtered replicated text with PII removed 1340 is accompanied by an animation 1342 of the utterer and the filtered replicated text with PII removed 1340 is associated with an undetectable voice with PII removed 1344. Hence, it may be appropriate to provide the filtered replicated text with PII removed 1340 to minimize the inclusion of PII content. The animation 1342 may be further altered to conform with the removal of the PII content.

In some implementations, text corresponding to PII may be replaced in different ways. For example, the PII may be replaced by a placeholder, by a period of silence, by a generated tone, and so on. In general, the text with PII is to be automatically removed since otherwise the anonymization may be ineffective. If the user gives information (such as a name or other identifying information, such as a social security number, a birthday, or so on) the user's identity could be determined even if the voice stream is anonymized. By the end of the modifications in FIG. 13, there is a voice stream and a facial anonymization that has characteristics of the original user, but cannot be traced back to the identity of the original user.

Figure 14:
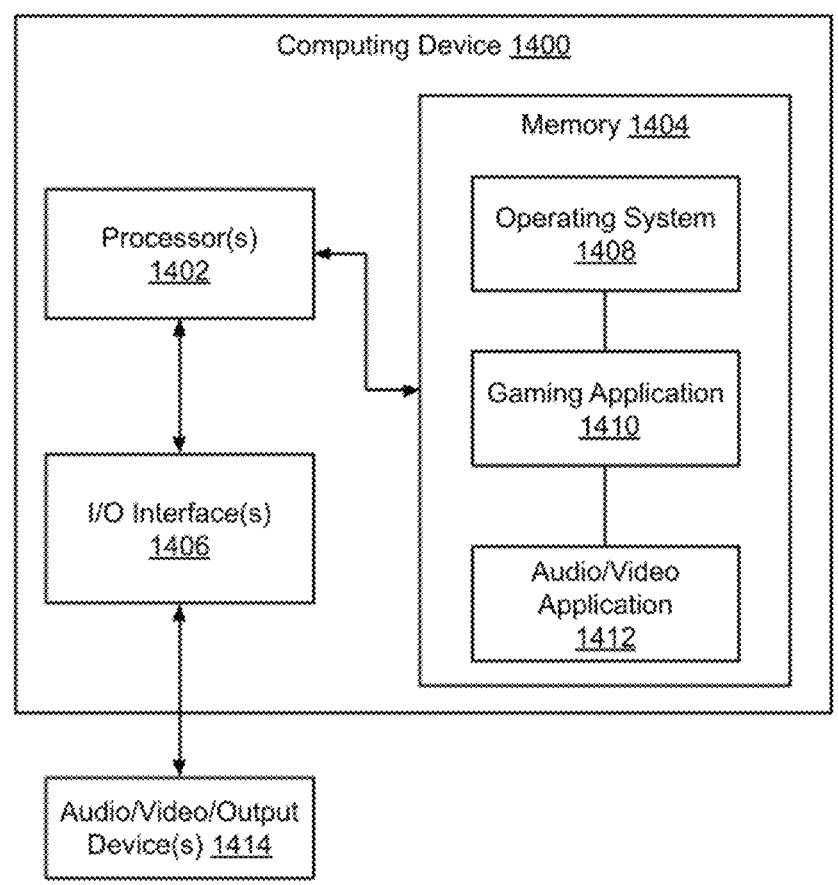
FIG. 14 is a block diagram that illustrates an example computing device, in accordance with some implementations.

FIG. 14—Computing Device

FIG. 14 is a block diagram that illustrates an example computing device, in accordance with some implementations.

FIG. 14 is a block diagram of an example computing device 1400 which may be used to implement one or more features described herein. In one example, device 1400 may be used to implement a computer device (e.g. 102 and/or 110 of FIG. 1), and perform appropriate method implementations described herein. Computing device 1400 can be any suitable computer system, server, or other electronic or hardware device. For example, the computing device 1400 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1400 includes a processor 1402, a memory 1404, input/output (I/O) interface 1406, and audio/video input/output devices 1414.

Processor 1402 can be one or more processors and/or processing circuits to execute program code and control basic operations of the device 1400. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1404 is typically provided in device 1400 for access by the processor 1402, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1402 and/or integrated therewith. Memory 1404 can store software operating on the server device 1400 by the processor 1402, including an operating system 1408, one or more applications 1410, e.g., an audio/video application 1412. In some implementations, application 1410 can include instructions that enable processor 1402 to perform the functions (or control the functions of) described herein, e.g., some or all of the methods described with respect to FIGS. 4, 9, and 12.

For example, applications 1410 can include an audio/video application 1412, which as described herein can provide avatar voice transmission without personally identifiable information (PII) within an online virtual experience server (e.g., 102). Elements of software in memory 1404 can alternatively be stored on any other suitable storage location or computer-readable medium. In addition, memory 1404 (and/or other connected storage device(s)) can store instructions and data used in the features described herein. Memory 1404 and any other type of storage (magnetic disk, optical disk, magnetic tape, or other tangible media) can be considered "storage" or "storage devices."

I/O interface 1406 can provide functions to enable interfacing the server device 1400 with other systems and devices. For example, network communication devices, storage devices (e.g., memory and/or data store 120), and input/output devices can communicate via interface 1406. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 1414 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 14 shows one block for each of processor 1402, memory 1404, I/O interface 1406, and software blocks of operating system 1408, gaming application 1410, and audio/video application 1412. These blocks may represent one or more processors or processing circuitries, operating systems, memories, I/O interfaces, applications, and/or software engines. In other implementations, device 1400 may not have all of the components shown and/or may have other elements including other types of elements instead of, or in addition to, those shown herein. While the device 1400 is described as performing operations as described in some implementations herein, any suitable component or combination of components of device 1400 or similar system, or any suitable processor or processors associated with such a system, may perform the operations described.

A user device can also implement and/or be used with features described herein. Example user devices can be computer devices including some similar components as the device 1400, e.g., processor(s) 1402, memory 1404, and I/O interface 1406. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 1414, for example, can be connected to (or included in) the device 1400 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 400 or method 800*b*) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method to generate a voice stream with removed personally identifiable information (PII), the method comprising:
   receiving, by a hardware processor, an original voice stream from a user;
   converting the original voice stream to text using a machine learning (ML) voice transcription model;
   processing the original voice stream to generate timing metadata annotations and audio metadata annotations based on words and syllables in the original voice stream and associating the timing metadata annotations and the audio metadata annotations to associated words and syllables in the text that correspond to the words and syllables in the original voice stream, wherein:
      the timing metadata annotations indicate timing of when the associated words and syllables are spoken and timing between the associated words and syllables; and
      the audio metadata annotations indicate auditory properties of the associated words and syllables, wherein the auditory properties include volume changes and pitch changes;
   generating facial expression data based on the text corresponding to the original voice stream, wherein the facial expression data defines facial expressions that are displayed when an avatar of the user utters the text;
   generating facial metadata annotations providing the facial expression data for the associated words and syllables;
   generating, by applying a machine learning (ML) voice synthesis model to the text, the timing metadata annotations, and the audio metadata annotations, an anonymized voice stream corresponding to the text having one or more auditory properties of the original voice stream based on the audio metadata annotations, wherein generating the anonymized voice stream includes removing one or more characteristics of one or more of the auditory properties of the original voice stream that are indicative of user identity of the user; and
   generating, using a machine learning (ML) animation synthesis model, a facial animation of the avatar of the user based on the text and the facial metadata annotations, wherein the facial animation includes the facial expressions that correspond to the text and correspond to the anonymized voice stream.

2. The method of claim 1, further comprising transmitting the text, the timing metadata annotations, the audio metadata annotations, and the facial metadata annotations from a first device to a receiving device,
   wherein generating the anonymized voice stream and generating the facial animation are performed by the receiving device.

3. The method of claim 1, further comprising providing the anonymized voice stream as a voice stream spoken by the avatar of the user in a virtual experience.

4. The method of claim 1, wherein the audio metadata annotations and the facial metadata annotations are associated with the words and syllables in the text as key-value pairs.

5. The method of claim 1, wherein the generating the anonymized voice stream comprises filtering the anonymized voice stream to remove the one or more auditory properties of the original voice stream corresponding to the personally identifiable information (PII), wherein the filtering is based at least in part on the timing metadata annotations and the audio metadata annotations.

6. The method of claim 1, further comprising:
   capturing a plurality of images of the user as the original voice stream is spoken by the user;
   associating a corresponding image of the user with respective one or more of the words and syllables of the original voice stream;
   wherein generating the facial expression data includes analyzing each corresponding image to generate respective Facial Action Coding System (FACS) data; and
   storing the FACS data as at least part of the facial metadata annotations to the text.

7. The method of claim 1, wherein generating the facial expression data includes determining lip motions and facial changes for the avatar of the user based on the text and the original voice stream.

8. The method of claim 1, wherein generating the audio metadata annotations includes analyzing acoustic characteristics of the original voice stream to determine at least one of the audio metadata annotations.

9. The method of claim 1, further comprising:
   after generating the anonymized voice stream, further modifying the anonymized voice stream by performing at least one of filtering or smoothing on the anonymized voice stream.

10. The method of claim 1, further comprising:
    prior to the generating the anonymized voice stream, editing the text to remove personally identifiable information (PII) from the text and to replace the removed PII with placeholder text information identifying a type of the removed PII such that the text is modified text, wherein the anonymized voice stream and the facial animation are generated based on the modified text.

11. The method of claim 1, further comprising:
    selecting a filter from a plurality of available filters based on input from the user; and
    filtering the anonymized voice stream using the selected filter to match a particular vocal style.

12. The method of claim 1, wherein generating the audio metadata annotations includes sending an identity of the user and the text to the ML voice synthesis model, and further comprising generating at least a portion of the audio metadata annotations by the ML voice synthesis model based on the text and the identity of the user,
    wherein the ML voice synthesis model is trained to provide output metadata from input text streams and input user identities.

13. A non-transitory computer-readable medium comprising instructions that, responsive to execution by a processing device, causes the processing device to perform operations comprising:
    receiving an original voice stream from a user;
    converting the original voice stream to text using a machine learning (ML) voice transcription model;
    processing the original voice stream to generate timing metadata annotations and audio metadata annotations based on words and syllables in the original voice stream and associating the timing metadata annotations and the audio metadata annotations to associated words and syllables in the text that correspond to the words and syllables in the original voice stream, wherein:

the timing metadata annotations indicate timing of when the associated words and syllables are spoken and timing between the associated words and syllables; and the audio metadata annotations indicate auditory properties of the associated words and syllables, wherein the auditory properties include volume changes and pitch changes;

generating facial expression data based on the text corresponding to the original voice stream, wherein the facial expression data defines facial expressions that are displayed when an avatar of the user utters the text;

generating facial metadata annotations providing the facial expression data for the associated words and syllables;

generating, by applying a machine learning (ML) synthesis model to the text, the timing metadata annotations, the audio metadata annotations, and the facial metadata annotations:

an anonymized voice stream corresponding to the text having one or more auditory properties of the original voice stream based on the timing metadata annotations and the audio metadata annotations, wherein generating the anonymized voice stream includes removing one or more characteristics of one or more of the auditory properties of the original voice stream that are indicative of user identity of the user; and a facial animation of the avatar of the user based on the text, the timing metadata annotations, and the facial metadata annotations, wherein the facial animation includes the facial expressions that correspond to the text and correspond to the anonymized voice stream.

14. The non-transitory computer-readable medium of claim 13, wherein the operations further comprise:

capturing a plurality of images of the user as the original voice stream is spoken by the user;

associating a corresponding image of the user with respective one or more of the words and syllables of the original voice stream;

wherein generating the facial expression data includes analyzing each corresponding image to generate respective Facial Action Coding System (FACS) data; and storing the FACS data as at least part of the facial metadata annotations to the text.

15. The non-transitory computer-readable medium of claim 13, wherein generating the audio metadata annotations includes at least one of:

analyzing acoustic characteristics of the original voice stream to determine at least one of the auditory properties of the audio metadata annotations.

16. The non-transitory computer-readable medium of claim 13, wherein generating the audio metadata annotations includes sending an identification of a specific voice for the user to the ML synthesis model and determining the audio metadata annotations by the ML synthesis model based on the text and the identification of the specific voice for the user, wherein the ML synthesis model predicts auditory properties associated with a given user from a given text stream when provided with the identification of the specific voice for the user using a machine learning (ML) metadata prediction model.

17. A system comprising:

a memory with instructions stored thereon; and a processing device, coupled to the memory, the processing device configured to access the memory and execute the instructions, wherein the instructions cause the processing device to perform operations including:

receiving an original voice stream from a user;

converting the original voice stream to text using a machine learning (ML) voice transcription model;

processing the original voice stream to generate timing metadata annotations and audio metadata annotations based on words and syllables in the original voice stream and associating the timing metadata annotations and the audio metadata annotations to associated words and syllables in the text that correspond to the words and syllables in the original voice stream, wherein:

the timing metadata annotations indicate timing of when the associated words and syllables are spoken and timing between the associated words and syllables; and the audio metadata annotations indicate auditory properties of the associated words and syllables, wherein the auditory properties include volume changes and pitch changes;

generating facial expression data based on the text corresponding to the original voice stream, wherein the facial expression data defines facial expressions that are displayed when an avatar of the user utters the text;

generating facial metadata annotations providing the facial expression data for the associated words and syllables;

generating, by applying a machine learning (ML) voice synthesis model to the text, the timing metadata annotations, and the audio metadata annotations, an anonymized voice stream corresponding to the text having one or more auditory properties of the original voice stream based on the audio metadata annotations, wherein generating the anonymized voice stream includes removing one or more characteristics of one or more of the auditory properties of the original voice stream that are indicative of user identity of the user; and generating, using a machine learning (ML) animation synthesis model, a facial animation of the avatar of the user based on the text and the facial metadata annotations, wherein the facial animation includes the facial expressions that correspond to the text and correspond to the anonymized voice stream.

18. The system of claim 17, wherein the operations further comprise:

capturing a plurality of images of the user as the original voice stream is spoken by the user;

associating a corresponding image of the user with respective one or more of the words and syllables of the original voice stream;

wherein generating the facial expression data includes analyzing each corresponding image to generate respective Facial Action Coding System (FACS) data; and storing the FACS data as at least part of the facial metadata annotations to the text.

19. The system of claim 17, wherein generating the facial expression data includes determining lip motions and facial changes for the avatar of the user based on the text and the original voice stream.

20. The system of claim 17, wherein generating the audio metadata annotations includes sending an identity of the user and the text to the ML voice synthesis model, and further comprising generating at least a portion of the audio metadata annotations by the ML voice synthesis model based on the text and the identity of the user, wherein the ML voice synthesis model predicts auditory properties associated with a given user from a given text stream when provided with the identity of the user using a machine learning (ML) metadata prediction model.

* * * * *